(12) United States Patent
Watanabe et al.

(10) Patent No.: US 8,811,481 B2
(45) Date of Patent: Aug. 19, 2014

(54) MOVING PICTURE TRANSCODING APPARATUS, MOVING PICTURE TRANSCODING METHOD, AND MOVING PICTURE TRANSCODING PROGRAM

(75) Inventors: Kazuteru Watanabe, Tokyo (JP); Kazunori Ozawa, Tokyo (JP); Hironori Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 1217 days.

(21) Appl. No.: 12/600,988

(22) PCT Filed: May 23, 2008

(86) PCT No.: PCT/JP2008/059952
§ 371 (c)(1),
(2), (4) Date: Nov. 19, 2009

(87) PCT Pub. No.: WO2008/146892
PCT Pub. Date: Dec. 4, 2008

(65) Prior Publication Data
US 2010/0150238 A1    Jun. 17, 2010

(30) Foreign Application Priority Data
May 29, 2007  (JP) .................. 2007-141507

(51) Int. Cl.
*H04N 7/32* (2006.01)
*H04N 7/26* (2006.01)
*H04N 21/2343* (2011.01)

(52) U.S. Cl.
CPC ....... *H04N 19/00* (2013.01); *H04N 21/234309* (2013.01); *H04N 7/26941* (2013.01)
USPC ............ 375/240.13; 375/240.02; 375/240.12; 375/240.16

(58) Field of Classification Search
CPC ................. H04N 7/12; H04N 19/00
USPC ........... 375/240.08, 240.12, 240.13, E07.243, 375/240.16, E7.198, 240.02; 348/700
IPC ........................................... H04N 7/12
See application file for complete search history.

(56) References Cited

U.S. PATENT DOCUMENTS

| 6,463,101 | B1 * | 10/2002 | Koto | 375/240.13 |
| 6,950,464 | B1 * | 9/2005 | Shen et al. | 375/240.03 |
| 2003/0169817 | A1 * | 9/2003 | Song et al. | 375/240.13 |

FOREIGN PATENT DOCUMENTS

| JP | H07-170522 A | 7/1995 |
| JP | H08-205175 A | 8/1996 |

(Continued)

OTHER PUBLICATIONS

International Search Report for PCT/JP2008/059952 mailed Jul. 8, 2008.

*Primary Examiner* — Jay Patel
*Assistant Examiner* — Neil Mikeska
(74) *Attorney, Agent, or Firm* — Sughrue Mion, PLLC

(57) ABSTRACT

To provide a moving picture transcoding apparatus capable of suppressing deterioration of an image quality and capable of reducing a calculation amount required for transcoding an image, the moving picture transcoding apparatus which transcodes encoded moving picture data includes: a moving picture data producing unit for producing new moving picture data in which a specific frame of the encoded moving picture data is set as a head thereof; and a judging unit for judging whether or not a succeeding frame of the specific frame has been encoded by referring to a frame preceding the specific frame. Further, the moving picture data producing unit includes: a first frame transcoding process unit for transcoding the specific frame to a first frame which does not refer to another frame; and a succeeding frame transcoding process unit for again encoding a succeeding frame, which has been judged by the judging unit to refer to the frame preceding the specific frame, by referring to any one frame in a range from the succeeding frame judged by the judging unit to the specific frame.

11 Claims, 20 Drawing Sheets

(56) References Cited

FOREIGN PATENT DOCUMENTS

| JP | H11-187410 A | 7/1999 |
| JP | 2002-305733 A | 10/2002 |
| JP | 2004-165703 A | 6/2004 |
| JP | 2005-269532 A | 9/2005 |
| JP | 2006-180173 A | 7/2006 |

* cited by examiner

MOVING PICTURE TRANSCODING APPARATUS, MOVING PICTURE TRANSCODING METHOD, AND MOVING PICTURE TRANSCODING PROGRAM

TECHNICAL FIELD

This invention relates to a moving picture transcoding apparatus for transcoding encoded moving picture data.

BACKGROUND ART

With respect to related technical ideas, as moving picture compressing/encoding systems capable of transmitting moving picture data in low bit rates and in higher efficiencies when the moving picture data are transmitted, the moving picture compressing/encoding systems called "H.261" and "H.263" have been proposed based upon recommendation made by ITU-T (International Telecommunications Union-Telecommunication Standardization Sector).

Also, as other moving picture compressing/encoding systems, a system called MPEG-4 (Moving Picture Experts Group) has been proposed which has been internationally standardized by ISO/IEC (International Organization for Standardization/International Electrotechinal Commission).

Further, very recently, another moving picture compressing/encoding system called H.264/MPEG-4 AVC (Advanced Video Coding) which has been internationally standardized by ITU-T and ISO/IEC is attracting attention as the system capable of encoding and of transmitting moving picture data at higher efficiency than the moving picture compressing/encoding systems such as "H.261", "H.263", and "MPEG-4."

Among the above-mentioned moving picture compressing/encoding systems, there are proposed: an intra-prediction by which encoding is performed by employing only image data of a present frame; and an inter-prediction by which encoding is performed by referring to image data of a preceding (past) frame and image data of a succeeding (future) frame (refer to, for example, Patent Documents 1 and 2).

In the intra-prediction, as one example, when moving picture data is encoded, the moving picture data is segmented in a unit called a macroblock (for example, a block of 16×16 pixels). Then, in this intra-prediction, the moving picture data is encoded by the DCT (Discrete Cosine Transform) for each macroblock, and thereafter, a DCT coefficient obtained by the DCT transform is variable-length-coded as the encoding process for encoding the moving picture data for each macroblock at higher efficiency.

The above-mentioned DCT implies such a transforming technique that image data of a frame is resolved into frequency components such as a high frequency component and a low frequency component, and then, an encoding processing is carried out with respect to those frequency components. Also, in the H.264/MPEG-4 AVC system, the following method has been employed: while a block (4×4 pixels) is employed by further subdividing a macroblock of 8×8 pixels, a DIT (Discrete Integer Transform) is performed for the block, and thereafter, a DIT coefficient obtained by this DIT transform is variable-length-coded. The DIT transform can encode moving picture data at higher efficiency than that of the above-mentioned DCT transform.

In this case, a variable length coding operation implies the following encoding operation: when moving picture data is encoded, data with a small number of bytes is allocated to a higher appearance frequency value (DCT coefficient, DIT coefficient), whereas data with a large number of bytes is allocated to a lower appearance frequency value. As a consequence, the encoding efficiency can be further increased.

On the other hand, in the inter-prediction, a prediction image is produced based upon frames at different time instants, and data of a difference image between an input image and the prediction image is encoded. In this case, in accordance with the inter-prediction, since only the data of the difference image needs to be encoded, a higher encoding rate may be achieved, as compared with that of the intra-prediction.

Also, in this inter-prediction, in order to achieve a higher encoding rate, a motion compensating technique has been utilized. This motion compensation implies such an image encoding system that an encoding operation or the like is carried out by considering to which direction an object of interest has moved between two continuous frames. In this motion compensation, first of all, a motion vector (information for representing how long each of elements contained in a picture has been moved to which direction) is acquired between the adjoining frames. After this motion component has been removed, image data is encoded by employing the DCT, or the like, and then, encoded data which has encoded the image data is produced. In this case, when this encoded data is decoded, the encoded data is decoded based upon the motion vector information.

Also, generally speaking, three picture types are provided in the above-mentioned moving picture compressing/encoding systems, namely, an I picture (Intra-Picture), a P picture (Predictive Picture), and also, a B picture (Bidirectional Predictive Picture).

The I picture implies such a picture which is obtained by independently encoding a relevant frame irrespective of frames located before and after the frame. The P picture implies such a picture which is obtained by predictive-coding frames along a forward direction. The B picture implies such a picture which is obtained by predictive-coding frames along bidirectional direction, namely, the forward direction and the backward direction.

In this case, the above-mentioned Patent Document 1 discloses the technique related to the motion compensation among the moving picture compressing/encoding systems. Specifically, in the inter-prediction, in such a case where not only a forward direction prediction, but also a backward direction prediction is performed for a frame to be predicted, a motion vector is acquired by employing frames of bidirectional directions, and then, the motion-compensated prediction is carried out.

Also, the above-mentioned Patent Document 2 discloses the technique related to the motion compensation among the moving picture compressing/encoding systems. Specifically, in the inter-prediction, not only a forward direction prediction, but also a backward direction prediction is performed for a frame to be predicted so as to acquire the motion vector by employing the predicted frame having the smaller error, and then, the motion-compensated prediction is carried out.

On the other hand, in a moving picture transcoding apparatus which employs the above-mentioned moving picture compressing/encoding system, for example, in such a case where data encoded by the H.261 system is once stored in a memory, or the like, and then used, a first frame of stored image data (encoded data) cannot refer to image data of a preceding frame when the encoded data is reproduced (decoded). As a consequence, the first frame must be necessarily encoded by utilizing only the intra-prediction. This reason is that the decoded image is disturbed.

In this case, when it is desired to store frames of encoded data from a designated frame, if a P picture is the first frame, and then the P picture is directly decoded, there is a problem that the P picture cannot be correctly reproduced.

As a consequence, when the frames are stored from the designated frame, this designated frame is once decoded. Then, this decoded image is again encoded as the first frame by utilizing the intra-prediction. Also, a frame subsequent to this first frame is once decoded, and thereafter, is again encoded by employing the inter-prediction. However, since the frames are again encoded, there is such a problem that the image quality of the image is deteriorated. Also, there is another problem that processing loads are increased when the frames are again encoded. Accordingly, other technical ideas capable of solving the above-mentioned problems have been proposed (refer to, for example, Patent Document 3).

In the technique disclosed in Patent Document 3, in such a case where encoded data is stored from encoded data of a designated frame and then used, the encoded data (P picture) of the designated frame is once decoded. Subsequently, when the decoded data (P picture) is again encoded, either a first frame of a decoded image of the designated frame or each of several frames subsequent to this first frame is transcoded into an I picture by the intra-prediction. Then, the encoded data subsequent to the first frame is directly stored. As a result, since the first frame is transcoded into the I picture, the decoded image (picture) is prevented from being disturbed.
Patent Document 1: JP-A-2004-165703
Patent Document 2: JP-A-2006-180173
Patent Document 3: JP-A-2002-305733

DISCLOSURE OF THE INVENTION

Problems to be Solved by the Invention

However, the moving picture compressing/encoding system disclosed in Patent Document 3 has the below-mentioned problems:

FIG. 19 is a diagram showing an example for describing the problems of the related technical idea. Upper FIG. 19 shows a frame series of encoded data which is inputted to a moving picture transcoding apparatus. Lower FIG. 19 indicates a frame series outputted from the moving picture transcoding apparatus. It should be noted that as the moving picture compressing/encoding system, the H.264 system is exemplified. In this H.264 system, input encoded data which is designated in a first frame of a stored image is transcoded into a frame (I picture) called IDR (Instantaneous Decoding Refresh).

Now, as represented in FIG. 19, when a storage starting (reproducing) request is made from a P1 frame, if the moving picture transcoding method of Patent Document 3 is employed, then the below-mentioned results are obtained. Firstly, in this moving picture transcoding method, after the P1 frame has been decoded, the decoded P1 frame is transcoded into an IDR0' frame by performing the intra-prediction. Then, as to P2, P3, . . . , Pn−1, and Pn frames subsequent to the IDR0' frame, those frames are handled as output encoded data by maintaining the present conditions. In this case, if each of the P frames performs the forward direction prediction by employing only immediately preceding frame, then output encoded data may be reproduced while an image thereof is not disturbed. However, for example, in such a case where a specific P frame has referred to such a frame other than the immediately preceding frame so as to perform the inter-prediction, if the specific P frame is directly stored, then the decoded image is disturbed. Namely, there is such a problem that an image quality may be deteriorated.

Specifically, the P2 frame of upper FIG. 19 has performed the inter-prediction by referring to the IDR0 frame. In lower FIG. 19, when P1' frame (corresponding to P2 frame) is tried to be decoded, since there is no frame which constitutes predicted data, a disturbance is propagated.

Further, in the H.264 system, such an inter-prediction (Long Term prediction) can be performed by which a specific frame is stored in a reference frame buffer for a long term in addition to a frame immediately adjacent to a relevant frame, and then a frame can refer to the specific frame. As a result, in such a case where an inter-frame predicted by the Long Term prediction has referred to an image of a frame preceding a first frame of a stored image, if the inter-frame is directly stored, then a decoded image is disturbed, namely, there is a problem that an image quality is deteriorated.

The problems occurred in this Long Term prediction will now be described by employing a specific example in FIG. 20.

FIG. 20 is a diagram of one example for describing the problems of the conventional technique. Upper FIG. 20 shows a frame series of encoded data which is inputted to a moving picture transcoding apparatus. Lower FIG. 20 indicates a frame series outputted from the moving picture transcoding apparatus.

Now, as represented in FIG. 20, when a storage starting (reproducing) request is made from a P1 frame, if the moving picture transcoding method of Patent Document 3 is employed, then the below-mentioned results are obtained. Firstly, in this moving picture transcoding method, after the P1 frame has been decoded, the decoded P1 frame is transcoded into an IDR0' frame by performing the intra-prediction. Then, as to P2, P3, . . . , Pn−1, and Pn frames subsequent to the IDR0' frame, those frames are handled as output encoded data by maintaining the present conditions. However, as shown in upper FIG. 20, if the Pn−1 frame has performed the Long Term prediction, when the decoded image is produced, since a frame data to which the Pn−1 frame refers has been dropped, there is such a problem that an image quality is deteriorated, namely, the decoded image is disturbed.

This invention has been made in view of the above-mentioned circumstances, and therefore, has an object to provide a moving picture transcoding apparatus, a moving picture transcoding method, and a moving picture transcoding program, capable of suppressing deterioration of an image quality, and capable of reducing a calculation amount required for transcoding an image.

Means to Solve the Problems

In order to attain the above object, a moving picture transcoding apparatus which transcodes encoded moving picture data includes: a moving picture data producing unit for producing new moving picture data in which a specific frame of the encoded moving picture data is set as a head thereof; and a judging unit for judging whether or not a succeeding frame of the specific frame has been encoded by referring to a frame preceding the specific frame. The moving picture data producing unit includes: a first frame transcoding process unit for transcoding the specific frame to a first frame which does not refer to another frame; and a succeeding frame transcoding process unit for again encoding a succeeding frame, which has been judged by the judging unit to refer to the frame preceding the specific frame, by referring to any one frame in a range from the succeeding frame judged by the judging unit to the specific frame.

Effect of the Invention

According to this invention, there are provided a moving picture transcoding apparatus, a moving picture transcoding method, and a moving picture transcoding program, capable of suppressing deterioration of an image quality, and capable of reducing a calculation amount required for transcoding an image.

BEST MODE FOR EMBODYING THE INVENTION

Referring now to drawings, a description is made of embodiments of this invention. In this case, a description is made of a moving picture transcoding apparatus which is operated based upon a moving picture transcoding program of this invention, and a moving picture transcoding method of this invention, which is executed by the above-mentioned moving picture transcoding apparatus.

The moving picture transcoding apparatus of this invention is a moving picture transcoding apparatus for transcoding encoded moving picture data. As one example, this moving picture transcoding apparatus receives moving picture data from an external appliance for distributing the moving picture data and temporarily stores the received moving picture data in a reception buffer. When a storage starting request signal from the external appliance is received, the moving picture transcoding apparatus produces moving picture data, employing a frame when this storage starting request was received as a first frame. Further, when this moving picture transcoding apparatus receives a storage ending request signal, the moving picture transcoding apparatus produces new moving picture data, employing a frame when the storage ending request signal was received as a last frame, and then, transmits the newly produced moving picture data to a terminal having a function for reproducing the moving picture data.

First Embodiment

[Structure]

Figure 1:
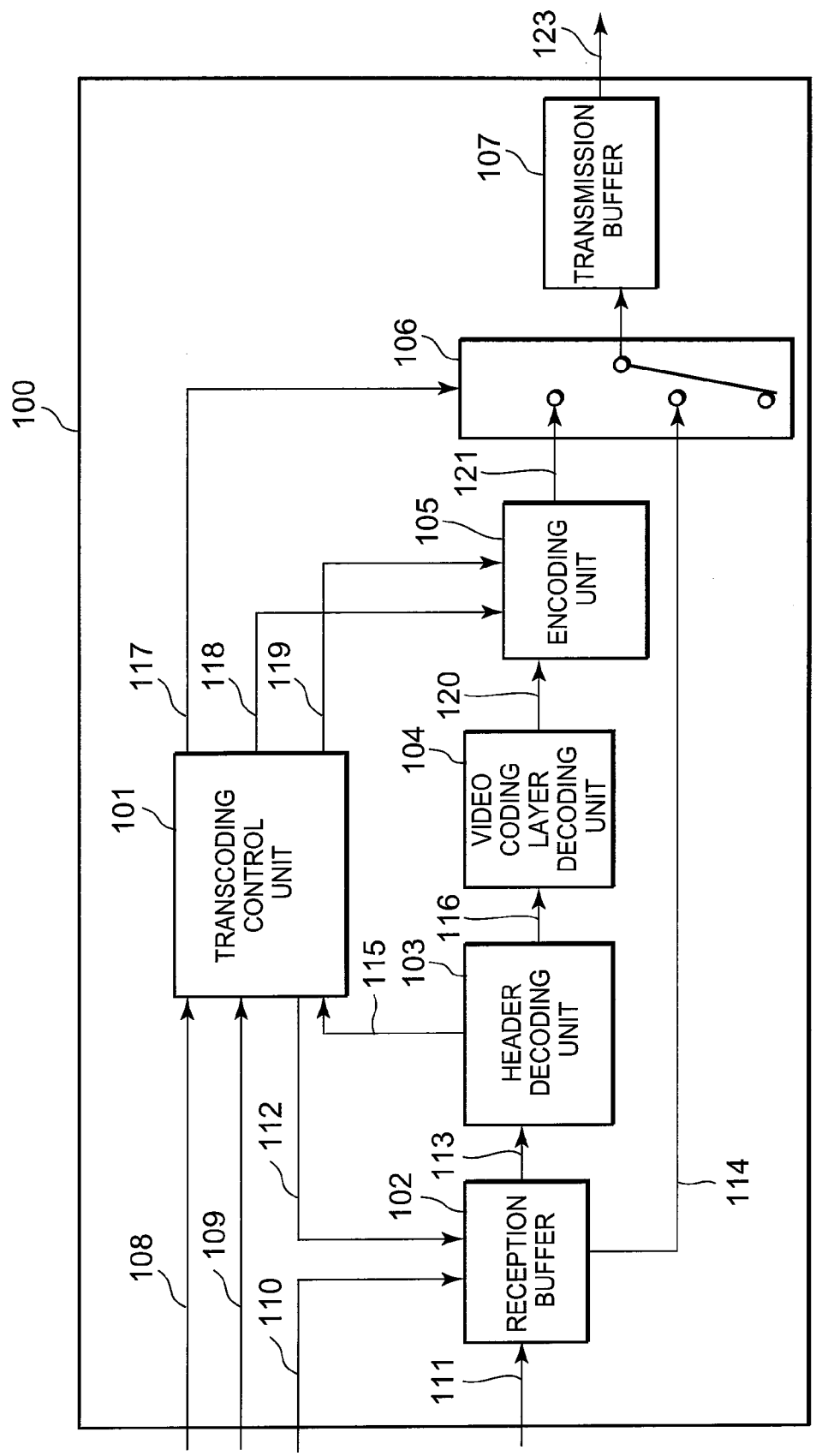
FIG. 1 is a structural diagram of a moving picture transcoding apparatus as an embodiment of this invention.

FIG. 1 is a structural diagram of a moving picture transcoding apparatus as one embodiment of this invention. As shown in FIG. 1, a transcoding control unit 101, a reception buffer 102, a header decoding unit 103, an video coding layer decoding unit 104, a decoding unit 105, a switch 106, and a transmission buffer 107 are provided in a moving picture transcoding apparatus 100 according to this invention.

The transcoding control unit 101 controls operations of the moving picture transcoding apparatus 100 in a comprehensive manner. A detailed description will be later made of the transcoding control unit 101.

The reception buffer 102 is a memory which temporarily stores thereinto encoded moving picture data 111 (hereinafter, simply referred to as "input image stream") which is transmitted from an external appliance.

Also, the reception buffer 102 receives input image streams in a time series manner, and outputs the received input image stream via the header decoding unit 103 to the video coding layer decoding unit 104. Also, in response to an instruction from the transcoding control unit 101, the reception buffer 102 outputs an input image stream via the switch 106 to the transmission buffer 107.

Figure 2:
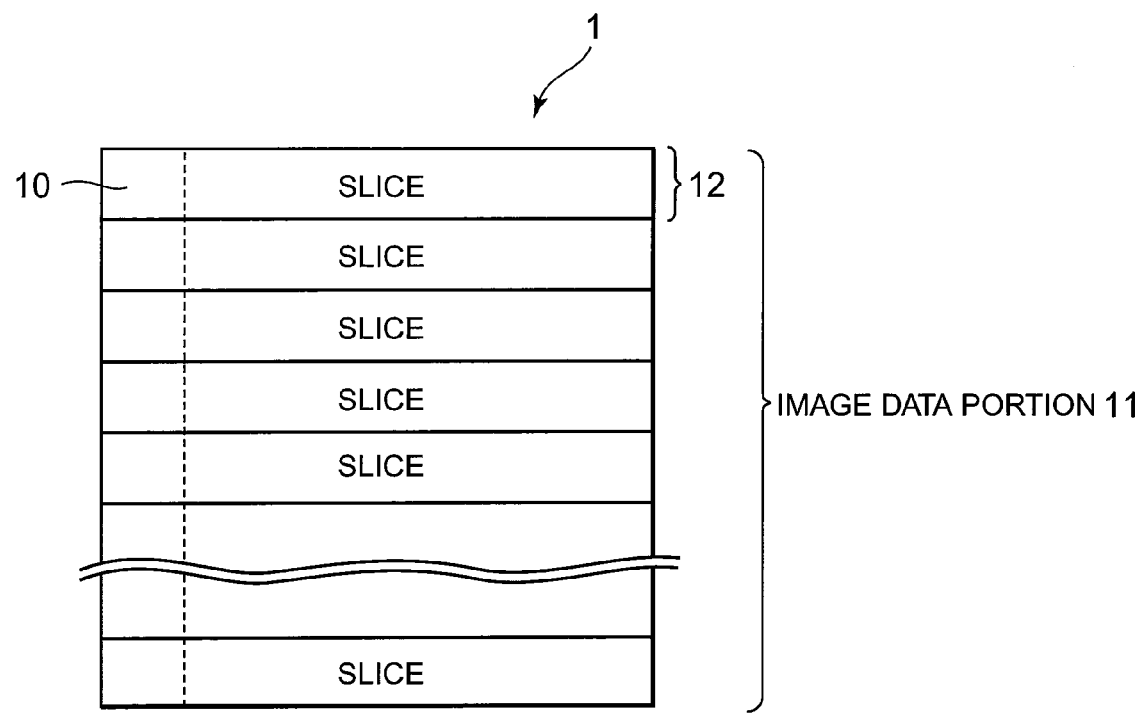
FIG. 2 is a diagram for showing an example of an internal structure of a frame.

FIG. 2 is a diagram for showing an example of an internal structure of a frame. It should be noted that for the sake of easy understandings of descriptions, the internal structure of the frame is simplified. As header information, input image stream information such as decoded information, a frame number, time information, a reference frame number, a frame type, is recorded in a header portion 10 of an encoded data 1.

As the decoded information, for instance, decoder configuration information (DCI), sequence parameter set (SPS), and picture parameter set (PPS) are exemplified.

Also, the frame number is a number indicative of a sequence from a first frame. The time information is information representative of time when a frame is produced. The reference frame number indicates a number of such a reference frame in the case where a frame to be transcoded refers to the other frame. The frame type indicates a sort of a frame, for example, an intra-frame (I picture), an inter-frame (P picture).

Further, an image data portion 11 of a decoded data 1 is made of a data structure which is called a plurality of slice layers. Further, this slice 12 is constituted by a plurality of macroblocks, and a macroblock is constituted by a plurality of blocks.

It should be noted that the reception buffer 102 has a function capable of detecting a slit for each of frames, or each of slices, and 102 can output an input image stream for each frame. As a slit of frames, or a slit of slices, for example, this slit is detected based upon a unique bit stream such as a start code which indicates the slit of the frames, or the slit of the slices.

The header decoding unit 103 decodes a header portion of decoded data of a frame of an input image stream, and notifies input image stream information 115 to the transcoding control unit 101. Also, the header decoding unit 103 transmits encoded data 116 of the input image stream to the video coding layer decoding unit 104.

The video coding layer decoding unit 104 receives the decoded data 116 of the input image stream from the reception buffer 102 via the header decoding unit 103 and then decodes the received decoded data 116 to produce a decoded image for each frame. The video coding layer decoding unit 104 stores decoded images whose total number corresponds to a predetermined frame number into a frame memory (not shown). In this case, until a storage starting request 108 is accepted by the transcoding control unit 101, the video coding layer decoding unit 104 deletes an old frame among frames of the decoded images every time a predetermined time has elapsed with respect to frames of input image streams which have been continuously received in a temporal manner, and decodes encoded data of the received latest frame, and then, stores the decoded data of the received latest frame in the frame memory.

The encoding unit 105 encodes image data 120 of a decoded image from the video coding layer decoding unit 104 in accordance with the above-mentioned intra-prediction, or inter-prediction. A detailed description thereof will be made later.

The switch 106 connects the reception buffer 102 or the decoding unit 105 to the transmission buffer 107 in response to an instruction issued from the transcoding control unit 101. Also, the switch 106 cuts off the reception buffer 102 or the decoding unit 105 which is connected to the transmission buffer 107 in response to an instruction issued from the transcoding control unit 101. Based upon the switching operations of the switch 106, the switch 106 may directly transmit the encoded data 114 of the input image stream to the transmission buffer 107 without being again encoded, or may transmit the encoded data 121 of the input image stream which has been encoded by the encoding unit 115 to the transmission buffer 107.

The transmission buffer 107 transmits an encoded frame which is received from the reception buffer 102 or the decoding unit 105 to a terminal having a moving picture data reproducing function as new encoded moving picture data 123 which is formed by a plurality of frames. Those frames contain a first frame and frames subsequent to the first frame.

Figure 3:
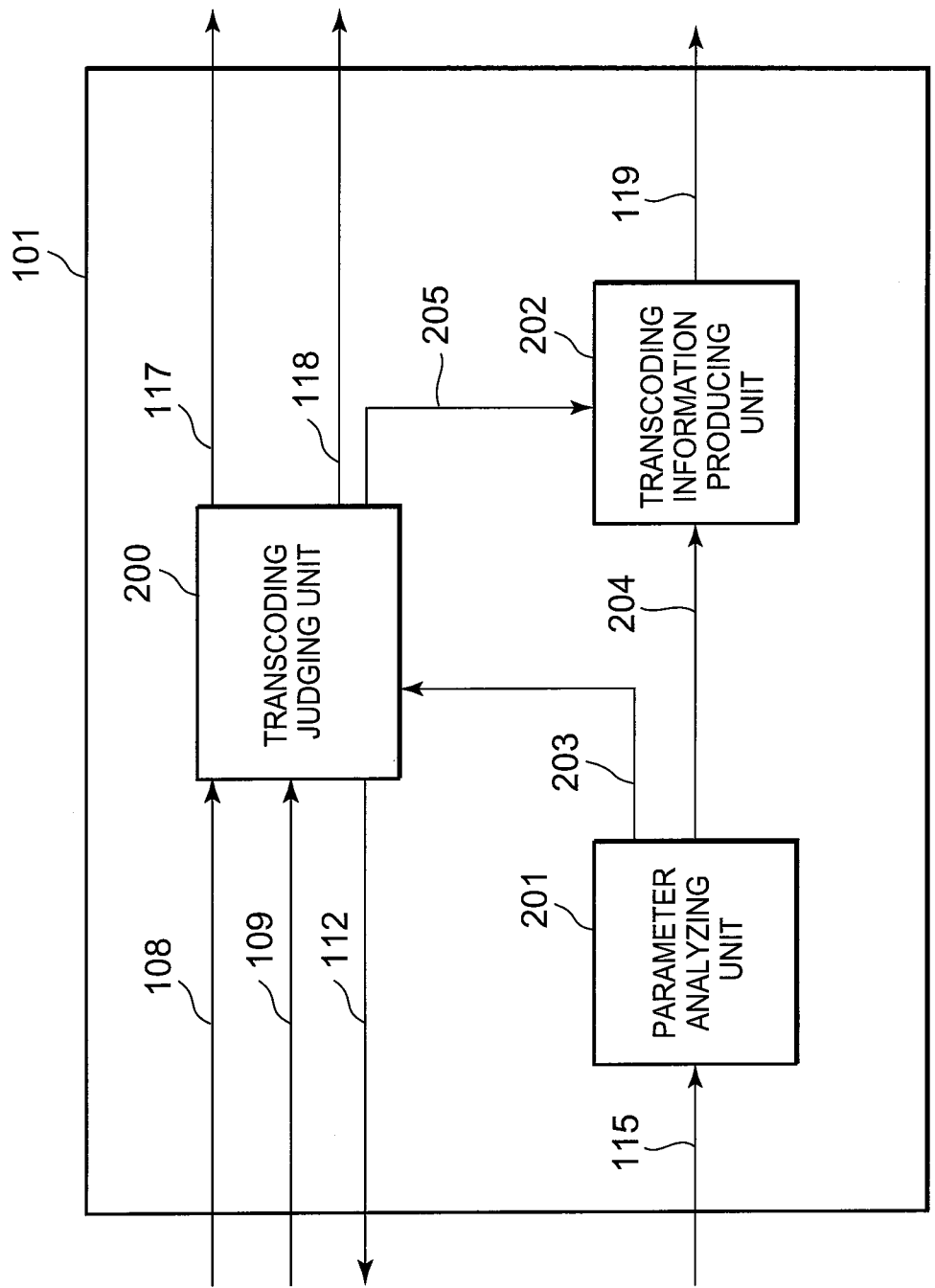
FIG. 3 is an internal structural diagram of a transcoding control unit shown in FIG. 1.

FIG. 3 is an internal structural diagram of the transcoding control unit shown in FIG. 1. As shown in FIG. 3, a moving picture transcoding program corresponding to an embodiment of this invention is installed in this transcoding control unit 101, a transcoding judging unit 200, a parameter analyzing unit 201, and a transcoding information producing unit 202 are configured (realized).

First, description is made of the parameter analyzing unit 201. The parameter analyzing unit 201 analyzes the input image stream information 115 received from the header decoding unit 103 shown in FIG. 1. Specifically, the parameter analyzing unit 201 analyzes whether or not a succeeding frame which succeeds a first frame of a stored image refers to a frame preceding the first frame, and then, notifies an analysis result notification 203 corresponding to the analysis result to the transcoding judging unit 200. Also, the parameter analyzing unit 201 transmits transcoding parameter information 204 with respect to the transcoding information producing unit 202. As the input image stream information 115 which is employed to be analyzed by the parameter analyzing unit 201, there are, for instance, the above-mentioned decoded information, frame number, time information, reference frame number, frame type, and the like.

Next, a description is made of the transcoding judging unit 200. The transcoding judging unit 200 (judging unit) judges whether or not a frame subsequent to such a frame which had accepted a storage starting request has referred to another frame and has been encoded (judging means).

Also, when the storage starting request 108 is received, the transcoding judging unit 200 issues a switching request 117 to the switch 106 in order that the encoding unit 105 is connected to the transmission buffer 107, which are shown in FIG. 1. Then, the transcoding judging unit 200 issues an image data acquiring request 118 to the encoding unit 105 to acquire the latest decoded image data decoded by the video coding layer decoding unit 104.

Also, the transcoding judging unit 200 issues a transcoding information producing request 205 to the transcoding information producing unit 202 to notify, among the input image stream information 115 received from the parameter analyzing unit 201, transcoding parameter information 119 required to produce a first frame of a stored image, to the decoding unit 105. As the necessary transcoding parameter 119, there are, for example, decoded information, a frame number, time information, a reference frame number, and a frame type of an input moving picture stream.

Also, even in the case where the transcoding judging unit 200 receives the analysis result notification 203 indicating that a frame succeeding a first frame of a stored image is referring to such a frame preceding the first frame of the stored image from the parameter analyzing unit 201, the transcoding judging unit 200 instructs in the switching request 117 to the switch 106 to connect the encoding unit 105 to the transmission buffer 107. Then, the transcoding judging unit 200 instructs in the image data acquiring request 118 to the encoding unit 105 to acquire the latest image data produced by the video coding layer decoding unit 104. Moreover, the transcoding judging unit 200 instructs in a transcoding information producing request 205 to the transcoding information producing unit 202 to notify, among the transcoding parameter information 204 received from the parameter analyzing unit 201, the transcoding parameter information 119 to the encoding unit 105, which is required for producing the succeeding frame.

Further, in a case where the transcoding judging unit 200 receives from the parameter analyzing unit 201, such an analysis result notification 203 that a frame succeeding a first frame of the stored image has not referred to a frame preceding the first frame of the stored image, the transcoding judging unit 200 instructs a switching request 117 to the switch 106 in order that the reception buffer is connected to the transmission buffer.

Then, the transcoding judging unit 200 instructs in a transmission request 112 to the reception buffer 102 to directly output an input image stream of a succeeding frame to the transmission buffer 107. In addition, upon reception of the storage ending request 109 from an external appliance, the transcoding judging unit 200 instructs in a switching request 117 to the switch 106 to, if the transmission buffer 107 has been connected to the reception buffer 102 or the encoding unit 105, cut off this connection.

Next, a description is made of the transcoding information producing unit 202.

Figure 4:
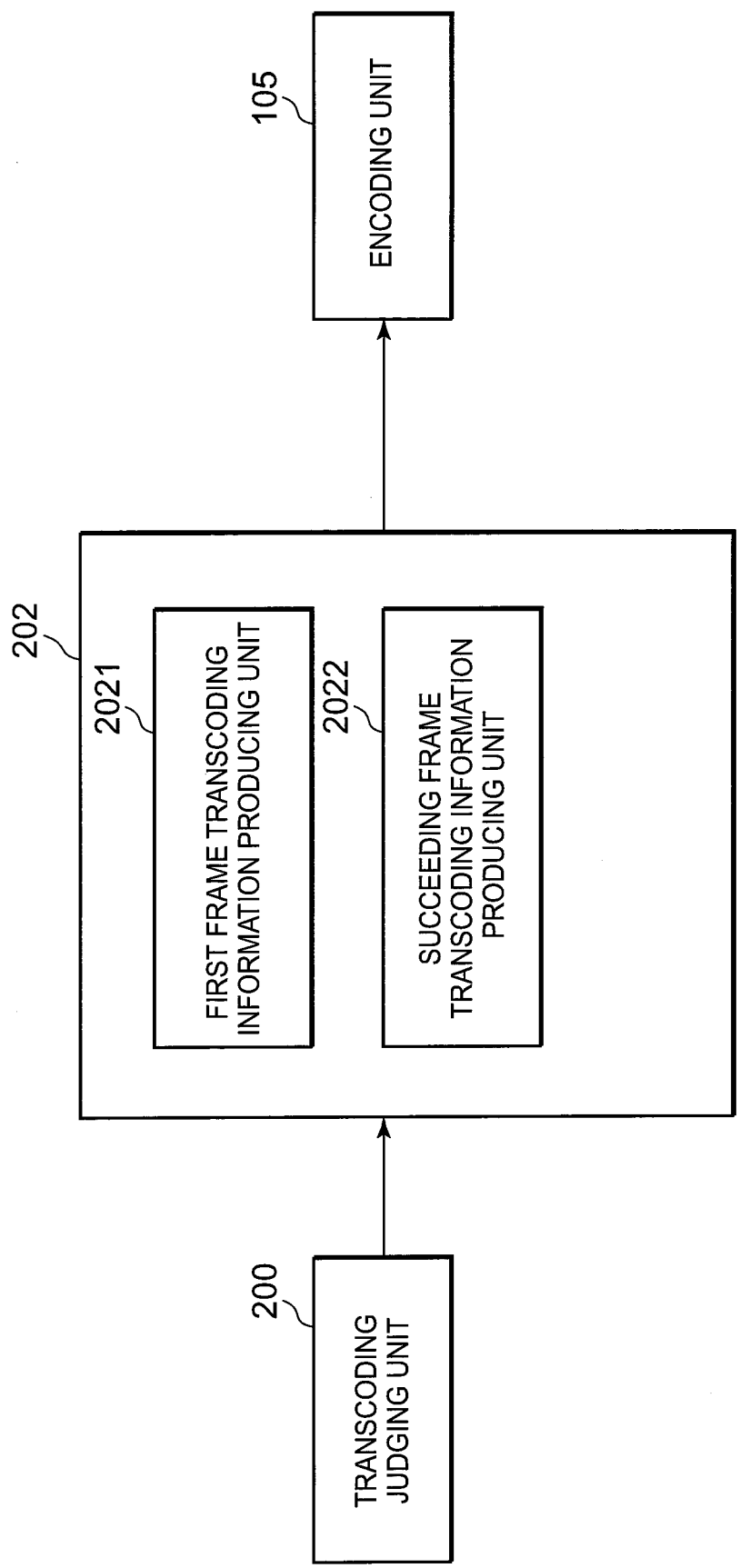
FIG. 4 is an internal structural diagram of a transcoding information producing unit.

FIG. 4 is an internal structural diagram of the transcoding information producing unit. A first frame transcoding information producing unit 2021 and a succeeding frame transcoding information producing unit 2022 are provided in this transcoding information producing unit 202.

The first frame transcoding information producing unit 2021 produces information for transcoding a frame which has accepted the storage starting request 108 into a first frame. As to the frame which has accepted the storage starting request 108, the first frame transcoding information producing unit 2021 selects, among the transcoding parameter information 204 received from the parameter analyzing unit 201, information required for producing a first frame, and then notifies the selected information to the encoding unit 105. As the information required for producing the first frame, there are, for example, a frame number, time information, a reference frame number, a frame type (I picture, P picture), and the like. The frame which has accepted the storage starting request 108 is transcoded into a first frame in the encoding unit 105 which will be described later. The processings of both the first frame transcoding information producing unit 2021 and the encoding unit 105 correspond to an example of a first frame transcoding process unit, a first frame transcoding processing step, and first frame transcoding means, which are described in this invention.

Also, in the case where the succeeding frame transcoding information producing unit 2022 transcodes a frame which succeeds the first frame by holding a frame number and time information, which have been acquired up to now after the first frame of the stored image had been produced, the succeeding frame transcoding information producing unit 2022 notifies a frame number, time information, and a reference frame number of an input image stream to the encoding unit 105. Then, the below-mentioned encoding unit 105 again encodes the below-mentioned frame based upon the inter-prediction. The processings of the succeeding frame transcoding information producing unit 2022 and the encoding unit 105 correspond to an example of a succeeding frame transcoding processing unit, a succeeding frame transcoding step, and succeeding frame transcoding means, which are described in this invention. Also, based upon the transcoding parameter information 119 supplied from the transcoding information producing unit 202 equipped with the first frame transcoding information producing unit 2021 and the succeeding frame transcoding information producing unit 2022, a processing for producing new moving picture data is carried out by the encoding unit 105, which corresponds to an example of moving picture data producing means described in this invention. Further, a series of arrangements for executing the above-mentioned processing corresponds to an example of a moving picture data producing unit.

Figure 5:
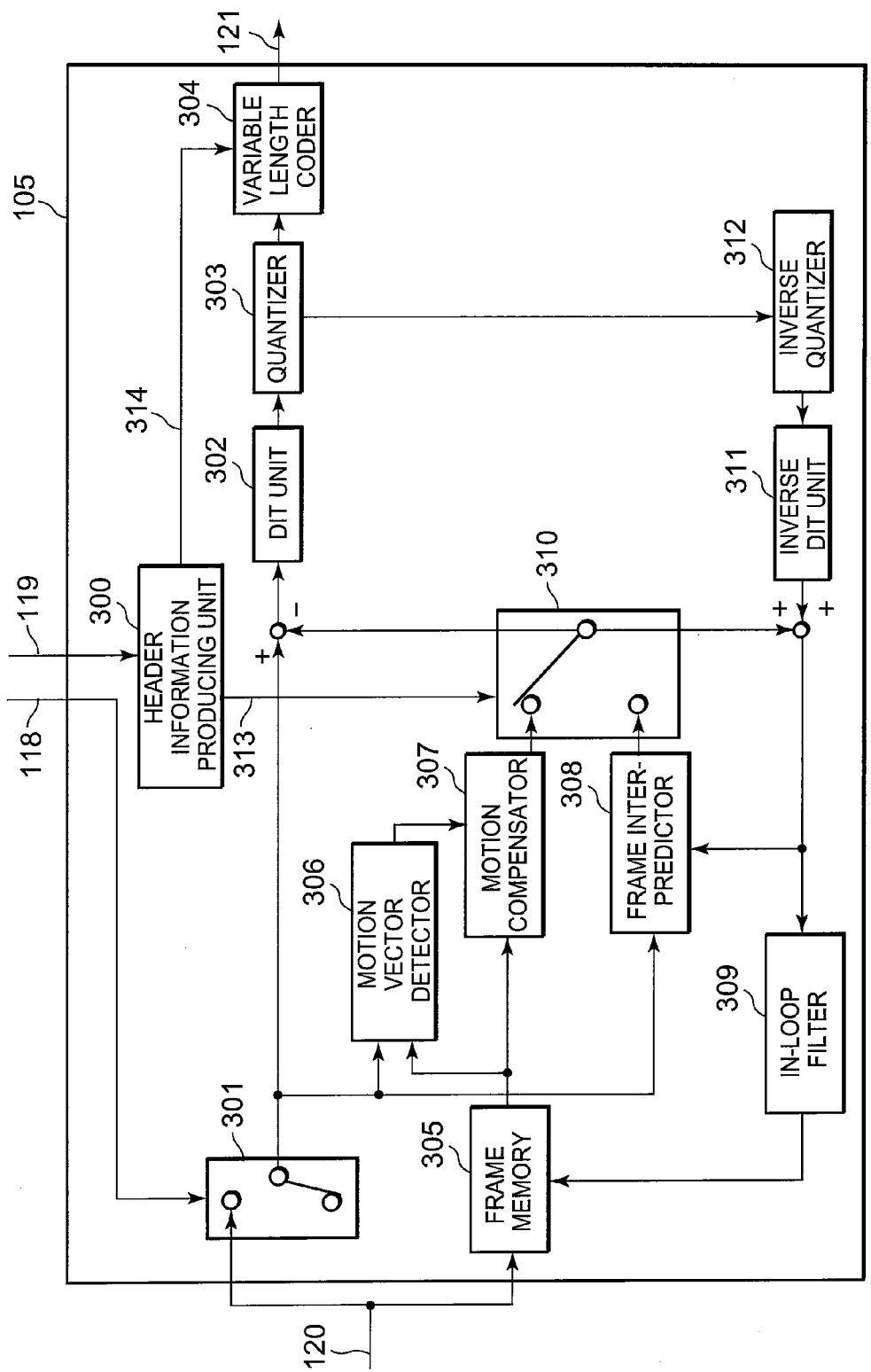
FIG. 5 is an internal structural diagram of an encoding unit shown in FIG. 1.

Next, a detailed description is made of the encoding unit 105 with reference to FIG. 5.

FIG. 5 is an internal structural diagram of the encoding unit shown in FIG. 1. The following description is made by exemplifying the above-mentioned moving picture compressing/encoding system of H.264/MPEG-4 AVC in the present embodiment, but this exemplification is merely an example for describing this invention, and therefore, this invention is not limited thereto. As apparent from the basic idea of this moving picture transcoding method, this invention may be applied to other moving picture compressing/encoding systems.

The encoding unit 105 is equipped with a header information producing unit 300, a switch-1 301, a DIT unit 302, a quantizer 303, a variable length coder 304, a frame memory 305, a motion vector detector 306, a motion compensator 307, a frame inter-predictor 308, an in-loop filter 309, a switch-2 (310), an inverse DIT unit 311, and an inverse quantizer 312.

The header information producing unit 300 produces header information 314 of a first frame or a succeeding frame based upon the transcoding parameter information 119 received from the transcoding control unit 101, and then outputs the header information 314 to the variable length coder 304.

When a frame type of the transcoding parameter information 119 is an intra-frame (I picture), the switch-2 310 is switched so as to receive an output from the frame inter-predictor 308. On the other hand, when a frame type of the transcoding parameter information 119 is an inter-frame (P picture), the switch-2 310 is switched so as to receive an output from the frame inter-predictor 308 or the motion compensator 307. The switch-1 301 is switched in response to an instruction issued from the transcoding control unit 101 shown in FIG. 1 so as to receive the latest image data 120 from the video coding layer decoding unit 104 as to a frame which is required to be transcoded. Alternatively, the frame memory 305 may acquire a decoded image produced in the video coding layer decoding unit 104 so as to update the memory thereof. It should be noted that in FIG. 5, because other arrangements are the same as those of a normal decoding unit, specific descriptions thereof are omitted, and will be made when operations of the moving picture transcoding apparatus 100 according to this invention are described.

As can be seen, the respective structures of the moving picture transcoding apparatus 100 according to this invention have been explained. Next, by employing a specific example, a description is made whether the moving picture transcoding apparatus 100 can produce new moving picture data without deteriorating an image quality and also reducing a calculation amount. It should be noted that detailed process flows will be later described with reference to flow charts.

Figure 6:
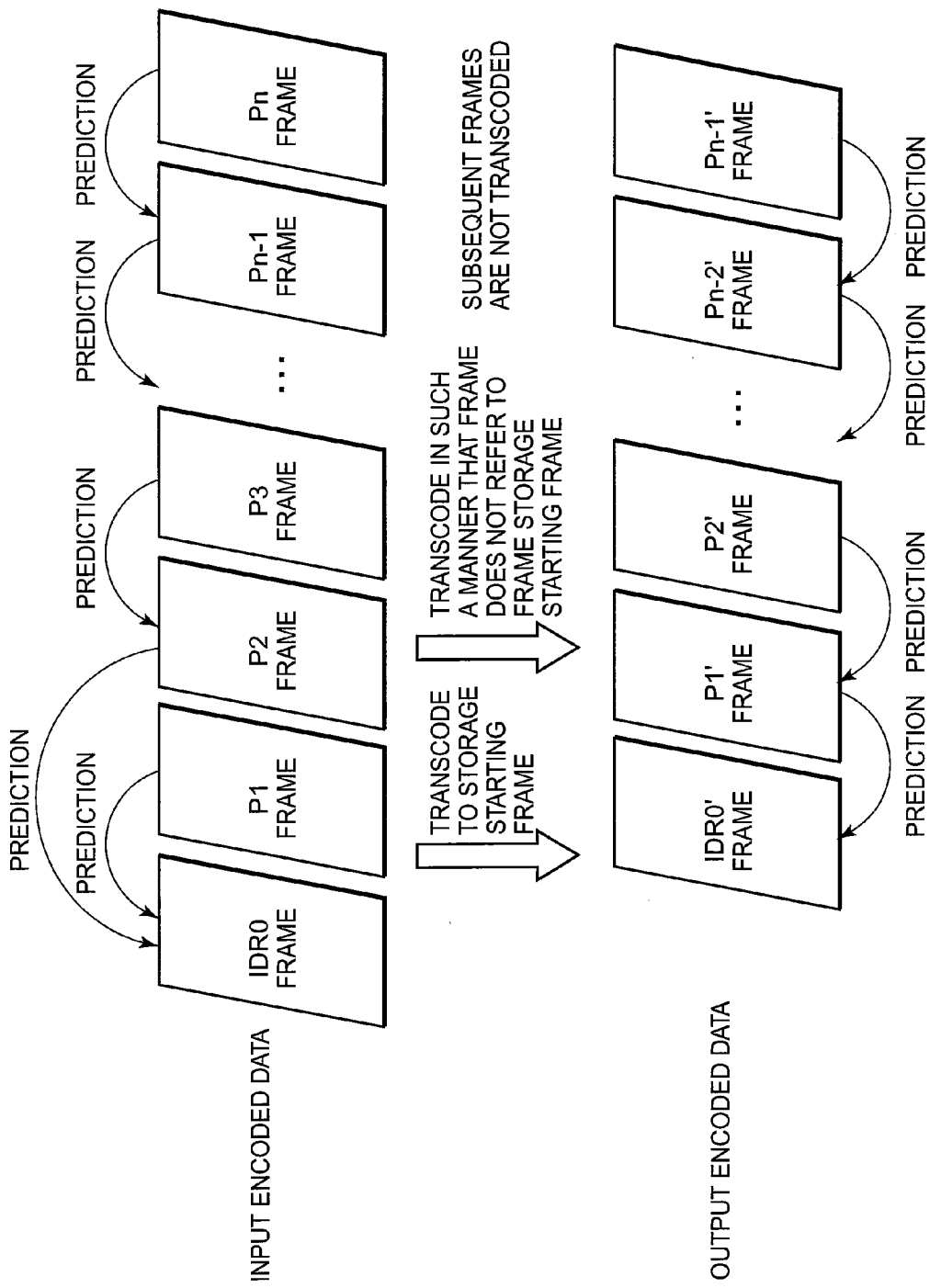
FIG. 6 is a diagram for describing generation of new moving picture data based upon a moving picture transcoding method according to this invention, as a comparison example of FIG. 19.
Figure 19:
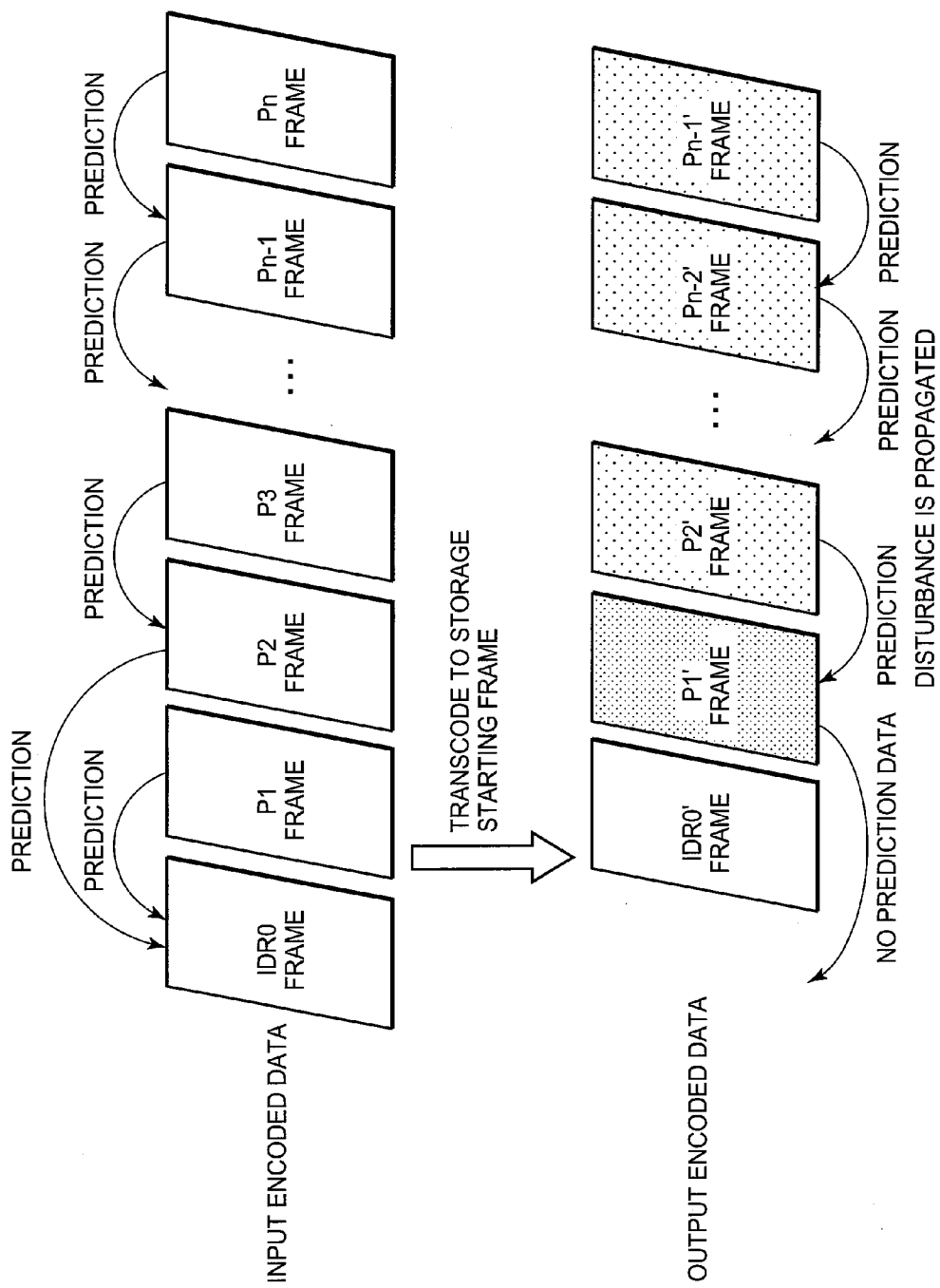
FIG. 19 is a diagram showing an example for describing the problems of the related technical idea.

FIG. 6 is a comparison example of FIG. 19, namely, diagrams for describing a production of new moving picture data based upon the moving picture transcoding method according to this invention.

Upper FIG. 6 shows a frame series of an input image stream (encoded data) which is inputted to the moving picture transcoding apparatus. Lower FIG. 6 shows a frame series (new moving picture data) which is outputted from the moving picture transcoding apparatus. It should be noted that the H.264 system will be exemplified as the moving picture compressing/encoding system in the below descriptions.

The moving picture transcoding apparatus 100 shown in FIG. 1 stores an input image stream indicated in upper FIG. 6 in the reception buffer 102. The input image stream stored in the reception buffer 102 is cut out in the unit of a frame, and the cut image frames are decoded by the video coding layer decoding unit 104, so a decoded image is produced. In the video coding layer decoding unit 104, decoded images are produced at any time. When decoded frames exceed a predetermined frame number, the firstly decoded frame is discarded; and then, the latest decoded images are sequentially stored.

For the sake of easy understandings of descriptions, in this case, there will be exemplified a case where, after an IDR0 frame shown in upper FIG. 6 has been decoded, when a P1 frame is being decoded, the storage starting request 108 is accepted by the transcoding control unit 101.

In this case, the P1 frame refers to an IDR frame to produce a decoded image. Then, this decoded image is transcoded to a first frame (IDR0') based upon the intra-prediction. A detailed description will be made of processings of the intra-prediction by the encoding unit 105.

Next, when the video coding layer decoding unit 104 shown in FIG. 1 decodes the encoded image to obtain a P2 frame, the video coding layer decoding unit 104 refers to the IDR0 frame to decode the encoded image. In this case, because the decoded image of the P2 has been inter-predicted by employing the IDR0, if the image data is again encoded by performing the inter-prediction with reference to the IDR0, then there is no IDR0 frame to be referred to by the video coding layer decoding unit 104 in a next decoding operation. As a result, an image is disturbed. Thus, in the moving picture transcoding method of this invention, the video coding layer decoding unit 104 refers only to the first frame (IDR0') in order not to refer to a frame which precedes a storage starting frame, and then, transcodes the P2 frame to a P1' frame by inter-predicting. As a result, when the P1' frame is decoded, since the image is not disturbed, so it is possible to suppress the deterioration of the image.

Also, as to succeeding frames P3, . . . , Pn−1, and Pn, which succeed the P2 frame, because the video coding layer decoding unit 104 does not refer to the frames succeeding the storage starting frame, those succeeding frames may be directly transmitted to the transmission buffer 107, and are not required to be again encoded. As a result, a calculation amount required for the frame transcoding can be reduced.

Figure 7:
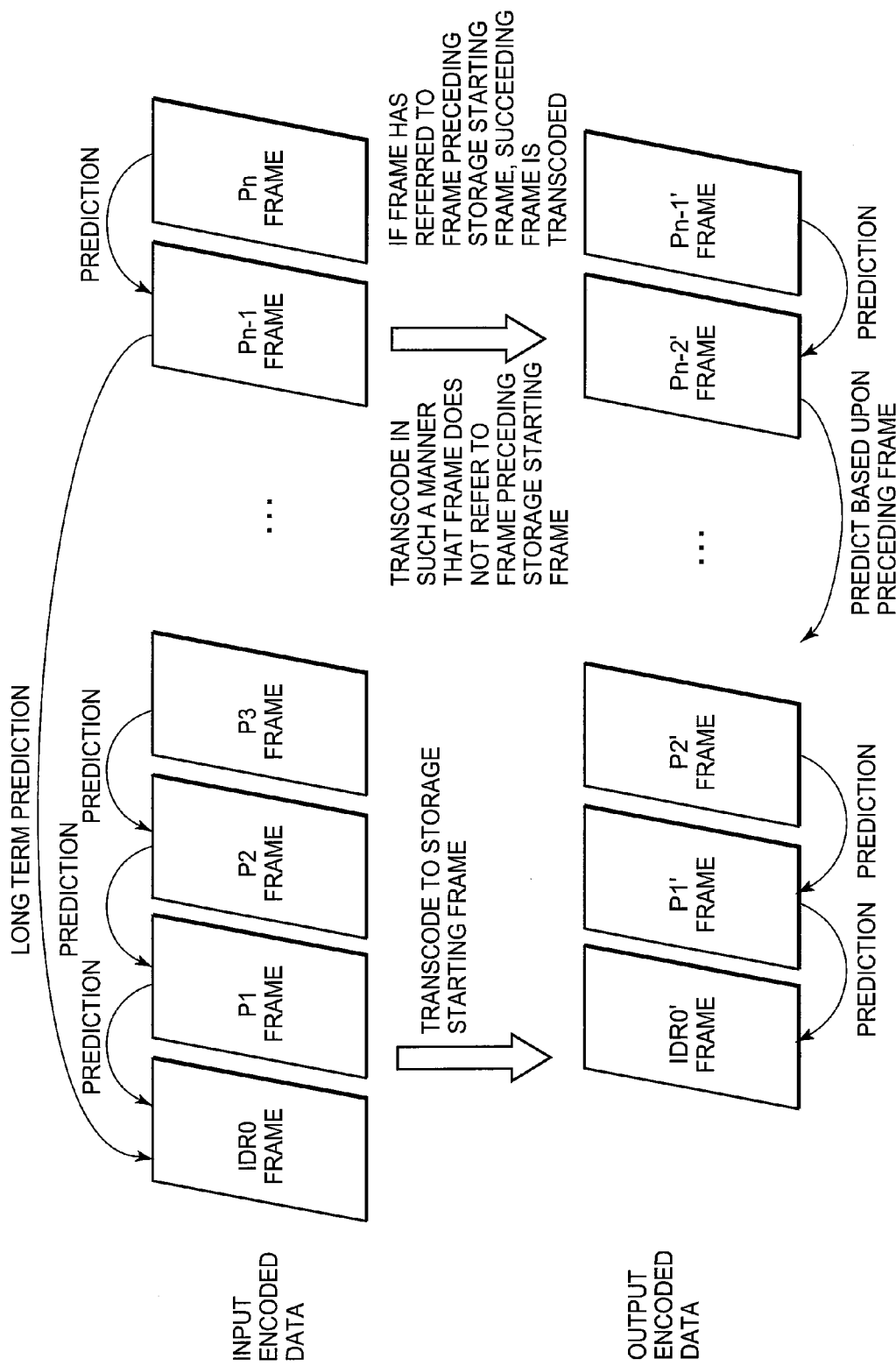
FIG. 7 is a diagram for explaining generation of new moving picture data based upon a moving picture transcoding method according to this invention, as a comparison example of FIG. 20.

Next, a specific description is made of a case where an inter-prediction (Long Term prediction) is carried out with reference to FIG. 7.

Figure 20:
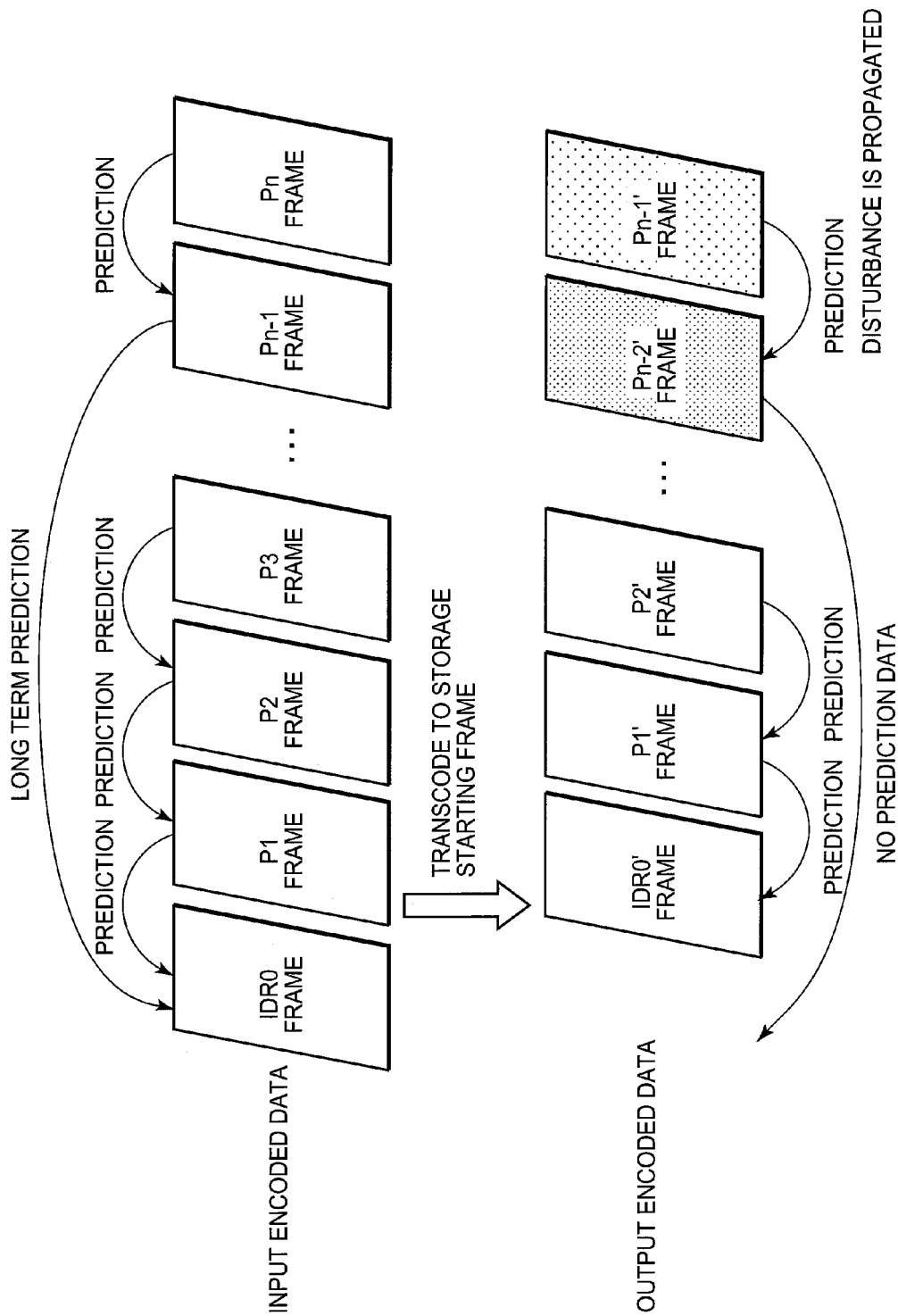
FIG. 20 is a diagram showing another example for describing the problems of the related technical idea.

FIG. 7 shows a comparison example of FIG. 20, namely, diagrams for describing a production of new moving picture data based upon the moving picture transcoding method according to this invention.

Similarly to upper FIG. 6, upper FIG. 7 shows a frame series of an input image stream (encoded data) which is inputted to the moving picture transcoding apparatus. Lower FIG. 7 shows a frame series (new moving picture data) which is outputted from the moving picture transcoding apparatus.

Now, as shown in upper FIG. 7, in a case where the storage starting request 108 is issued from the P1 frame, if the moving picture transcoding method of this invention is employed, the below-mentioned operation is performed. The P1 frame is transcoded to a first frame (IDR0'). Frames defined from the P2 frame up to a P3 frame directly constitute succeeding frames, because the video coding layer decoding unit 104 has not referred to frames preceding the storage starting frame.

On the other hand, because the Pn−1 frame has referred to the frames preceding the storage starting frame, as an example, the video coding layer decoding unit 104 refers to a Pn-3' (not shown) in order not to refer to the frames preceding the storage starting frame, and then, performs the inter-prediction to produce a Pn-2' (not shown) frame. As a consequence, when the Pn-2' frame is decoded, an image is not disturbed, so a deterioration of an image quality is suppressed. Also, the frames defined from the P2 frame up to the Pn-2 frame need not be again encoded, so a calculation amount required for performing the transcoding can be reduced.

It should be noted that in this embodiment, the IDR0' frame has been decoded at any time, and the Pn-2' frame is produced by referring to the immediately before decoded image. However, this is merely one example. Alternatively, the frames may be encoded by referring to frames equal to a maximum referring frame number which will be described later.

[Operations]

Next, a description is made of operations of the moving picture transcoding apparatus 100. In this moving picture transcoding apparatus 100, moving picture data is transcoded based upon the moving picture transcoding method according to an embodiment of this invention.

Figure 8:
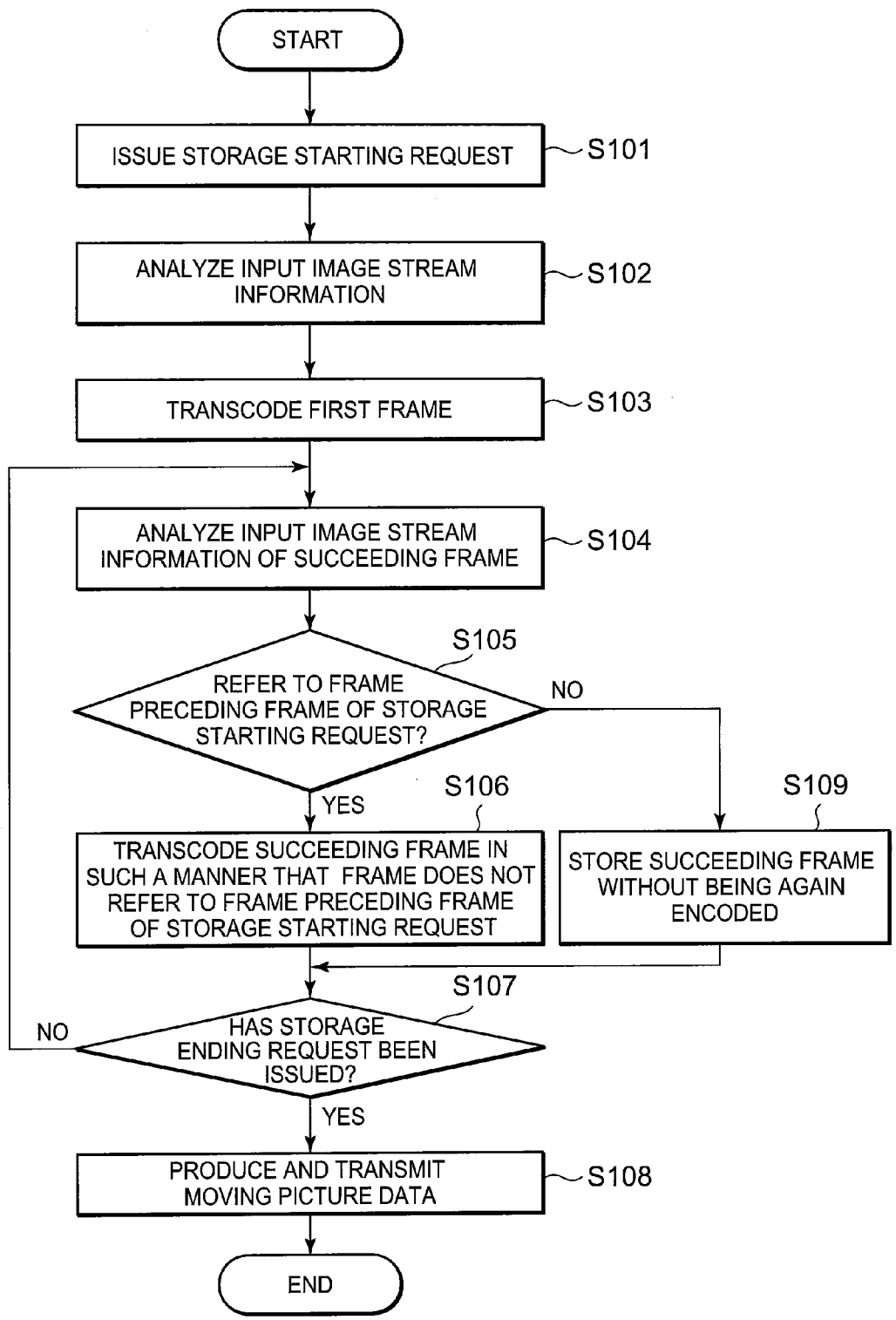
FIG. 8 is a flow chart for showing an example of a moving picture transcoding method executed by the moving picture transcoding apparatus, according to the embodiment of this invention.

FIG. 8 is a flow chart for indicating an example of operations of the moving picture transcoding apparatus according to one embodiment of this invention. This process routine is commenced when the transcoding judging unit 200 shown in FIG. 3 accepts a storage starting request 108. First, the transcoding judging unit 200 accepts the storage starting request 108 and then executes a storage starting request accepting processing (Step S101). Specifically, the transcoding judging unit 200 instructs in a switching request 117 to the switch 106 to connect the encoding unit 105 to the transmission buffer 107. Then, the transcoding judging unit 200 instructs in an image data acquiring request 118 the encoding unit 105 to acquire the latest image data produced by the video coding layer decoding unit 104.

Next, in the parameter analyzing unit 201 shown in FIG. 3, input image stream information 115 of a frame to which the storage starting request 108 was issued is decoded to analyze the frame information thereof (Step S102). Specifically, the parameter analyzing unit 201 analyzes whether a frame is an inter-prediction frame or an intra-prediction frame based upon the frame type thereof, and also analyzes that the frame is predicted by referring to which frame based upon the reference frame number thereof. Then, the parameter analyzing unit 201 notifies the input image stream information 115 to the transcoding judging unit 200 and the transcoding information producing unit 202.

Next, the transcoding judging unit 200 transcodes the frame to which the storage starting request 108 was issued into a first frame (Step S103).

Step S103 will now be described in detail. The transcoding judging unit 200 instructs the first frame information producing unit 2021 of the transcoding information producing unit 202 to notify the encoding unit 105 of the transcoding parameter information 119 to which the storage starting request 108 was issued.

The encoding unit 105 transcodes the frame to which the storage starting request was issued into a first frame. In this case, assuming now that the frame to which the storage starting request was issued corresponds to a P picture, the description is continued. In other words, the encoding unit 105 transcodes the P picture into an I picture in such a manner that an image can be constructed without reading a preceding frame which precedes the frame when the storage starting request was issued. When FIG. 6 is employed as an example, the P1 frame is transcoded into the IDR0' frame by the encoding unit 105.

If the above-mentioned frame transcoding is carried out, the IDR0' frame can construct the image without requiring the IDR0 which is required to construct an image of the P1 frame corresponding to the P picture.

Specifically, the header information producing unit 300 shown in FIG. 5 receives the transcoding parameter information 119, and newly produces information about a header portion of encoded data of the frame to which the storage starting request 108 was issued, and then outputs the newly produced header portion information to the variable length coder 304.

Also, the encoding unit 105 switches the switch-1 301 to receive image data 120 of a decoded image from the video coding layer decoding unit 104. When the intra-prediction is carried out, first, the frame inter-predictor 308 performs a frame inter-prediction to the image data 120 of the decoded image. Subsequently, the encoded data which has been predicted based upon the frame inter-prediction is inputted to the DIT unit 302 to be resolved into frequency components such as a low frequency component and a high frequency component by the discrete integer transform, and the encoding processing is performed.

Further, the quantizer 303 quantizes the frequency components such as the low frequency component and the high frequency component. Also, the variable length coder 304 performs an encoding operation in such a manner that data having a short byte number is allocated to a value with a high appearance frequency (DIT coefficient), whereas data having a long byte number is allocated to a value with a low appearance frequency.

As a result, the frame to which the storage starting request 108 was issued is transcoded into an IDR frame (I picture). It should be noted that in the encoding unit 105, the encoded data in which the frequency components such as the low frequency component and the high frequency component have been quantized by the quantizer 303 is decoded by the inverse quantizer 312 and the inverse DIT unit 311, and the decoded data is stored via the in-loop filter 309 into the frame memory 305. As a consequence, the same image as the image to be reproduced is stored, so a difference of the next input image can be calculated. That is to say, other frames refer to the IDR frame, and thus the inter-prediction can be carried out.

The above-mentioned first frame transcoding proceedings of Step S103 corresponds to an example of a first frame transcoding step described in this invention.

Next, a description is made of a transcoding processing for a succeeding frame. When a first frame is produced, the parameter analyzing unit 201 analyzes input image stream information of a next frame which succeeds a frame to which the storage starting request 108 was issued (Step S104).

Specifically, the parameter analyzing unit 201 notifies the transcoding judging unit 200 of information on whether or not the succeeding frame with respect to the first frame of the stored image has referred to the frame preceding the first frame based upon the reference frame number.

The transcoding judging unit 200 judges whether or not the succeeding frame has referred to the frame preceding the storage starting frame (first frame) based upon the analysis result of the parameter analyzing unit 201 (Step S105).

When the succeeding frame has not referred to the frame preceding the storage starting frame (first frame) ("NO" in Step S105), the succeeding frame is outputted to the transmission buffer 107 without again encoding the succeeding frame temporarily stored in the reception buffer (Step S109).

On the other hand, when the succeeding frame has referred to the frame preceding the storage starting frame (first frame) ("Yes" in Step S105), the succeeding frame is transcoded by being encoded in such a manner that the succeeding frame does not refer to a frame which precedes the frame of the storage starting request (Step S106).

The content of Step S106 is described more in detail. That is, the header information producing unit 300 receives the transcoding parameter information 119, and refers to a new first frame to rewrite the input image stream information of the succeeding frame. Then, the header information producing unit 300 newly produces information of a header portion of encoded data of the succeeding frame, and then outputs the newly produced header portion information to the variable length coder 304. Also, the encoding unit 105 switches the switch-1 301 to receive the image data 120 of the decoded image from the video coding layer decoding unit 104.

When the inter-prediction is carried out, the image data 120 of the decoded image is inputted to the motion vector detector 306. Also, the image data of the preceding frame image which has been stored in the frame memory 305 is also inputted to the motion vector detector 306. Then, a motion vector is detected by the motion vector detector 306. The signal of this motion vector is entered to the motion compensator 307, and then, the inter-prediction is carried out in order to compensate the motion vector by referring to the signal of the preceding frame image stored in the frame memory 305.

This encoded data which has been predicted based upon the frame inter-prediction is inputted to the DIT unit 302 to be resolved into frequency components such as a low frequency component and a high frequency component by the discrete integer transform, and the encoding processing is performed. Further, the quantizer 303 quantizes the frequency components such as the low frequency component and the high frequency component. Also, the variable length coder 304 performs an encoding operation in such a manner that data having a short byte number is allocated to a value with a high appearance frequency (DIT coefficient), whereas data having a long byte number is allocated to a value with a low appearance frequency. As a result, the succeeding frame is again encoded without referring to the frame preceding the storage starting frame (first frame).

Next, in a case where the transcoding judging unit 200 has not accepted the storage ending request 109 ("No" in Step S107), the processing routine is returned to Step S104 in which a next succeeding frame is analyzed. On the other hand, in a case where the transcoding judging unit 200 has accepted the storage ending request 109 ("Yes" in Step S107), the transcoding judging unit 200 cuts the switch 106 shown in FIG. 1 to output the new moving picture data stored in the transmission buffer 107 from the transmission buffer (Step S108). Then, this processing routine is ended. It should be noted that the processings defined from Step S104 to Step S107 correspond to an example of a succeeding frame transcoding step described in this invention.

As described above, the moving picture transcoding apparatus according to the first embodiment of this invention executes the moving picture transcoding method corresponding to an embodiment of this invention, so the deterioration of the image quality of the moving picture data can be suppressed, and the calculation amount required for encoding the moving picture data can be reduced.

In other words, the first frame transcoding means among the moving picture data producing means decodes the encoded data of the frame of the storage starting request, and thereafter, encodes the decoded image data without referring to other frames to transcode the decoded image data into the encoded data. As a consequence, it is possible to prevent the image quality from being deteriorated since the first frame transcoding means cannot refer to the preceding frame during the reproducing operation.

Also, the succeeding frame transcoding means among the moving picture data producing means again encodes a succeeding frame which is judged by the judging means to refer to the frame preceding the frame of the storage starting request without referring to the frame preceding the frame of the storage starting request. As a result, also as to the succeeding frame which has referred to the frame preceding the frame of the storage starting request, it is possible to prevent the image quality from being deteriorated since the first frame transcoding means cannot refer to the preceding frame during the reproducing operation.

Moreover, the succeeding frame transcoding means among the moving picture data producing means does not again encode a succeeding frame which is judged by the judging means not to refer to the frame preceding the frame of the storage starting request, but assumes this succeeding frame as a succeeding frame of new moving picture data. As a consequence, the moving picture transcoding apparatus 100 does not again encode the succeeding frame which has been judged not to refer to the frame preceding the frame of the storage starting request, so the moving picture transcoding apparatus 100 can reduce the calculation amount.

Second Embodiment

[Structure]

Next, a description is made of a second embodiment of this invention. It should be noted that although internal arrangements of the first embodiment and the second embodiment of this invention are partially different from each other, other arrangements thereof are substantially equal to each other. Accordingly, the same reference numerals of the first embodiment will be employed as those for denoting the same structural elements of the second embodiment, and descriptions thereof will be omitted, and further, the arrangements different from those of the first embodiment will be described in detail.

In the second embodiment of this invention, the below-mentioned rewriting function is additionally provided. That is, in such a case where a succeeding frame has referred to a frame subsequent to a newly transcoded first frame, only a frame number and time information are rewritten which specify the own frame with respect to the first frame. For instance, when there is a difference produced by comparing frame numbers and time information of frames which have been produced up to now after the first frame has been produced, a processing for correcting this difference is performed. The frame number and the time information correspond to one example of frame specific information described in this invention. The above-mentioned function is realized by the below-mentioned stream transcoding unit 403.

Figure 9:
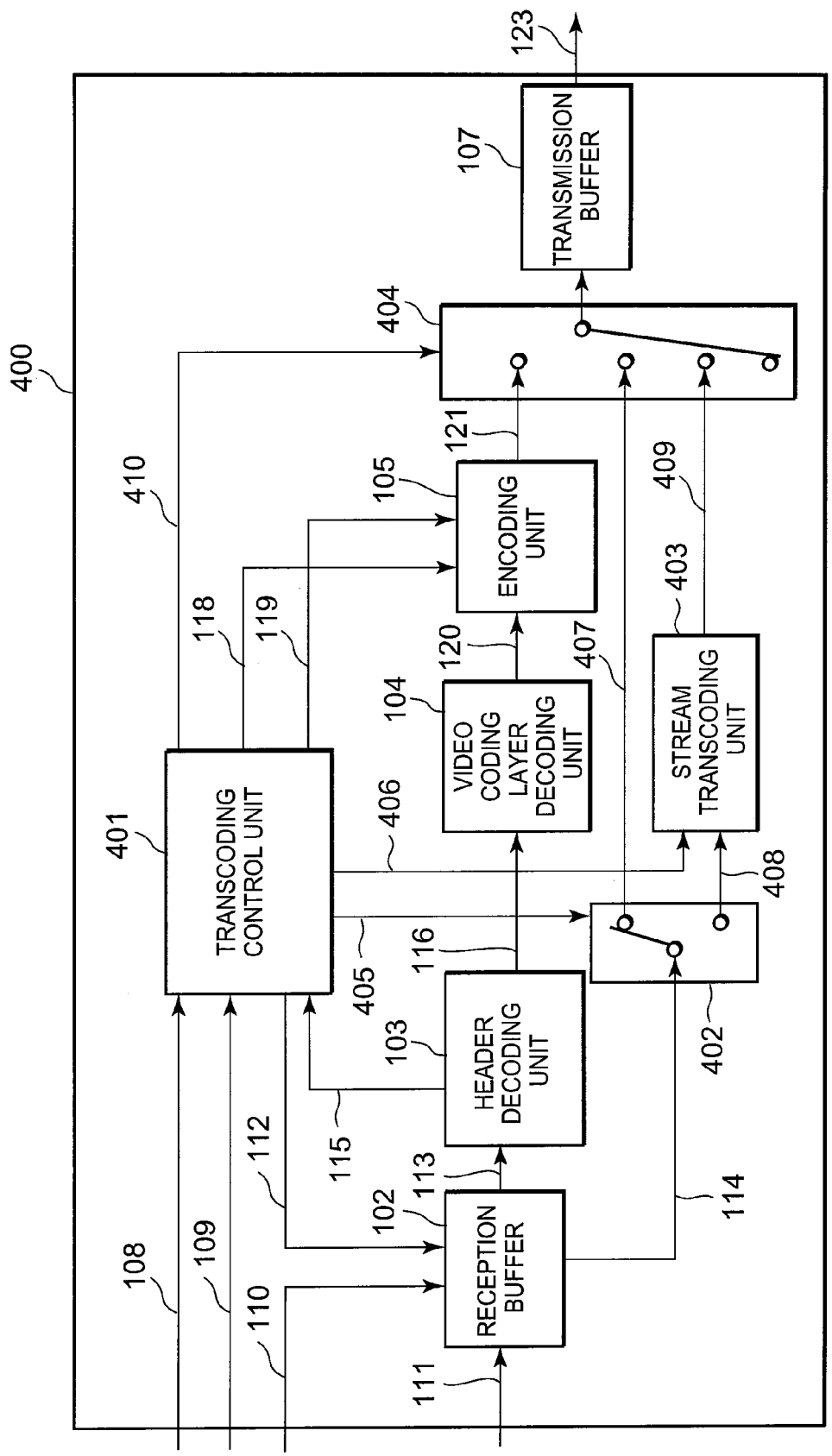
FIG. 9 is a diagram for showing an internal arrangement of a moving picture transcoding apparatus according to a second embodiment of this invention.
Figure 10:
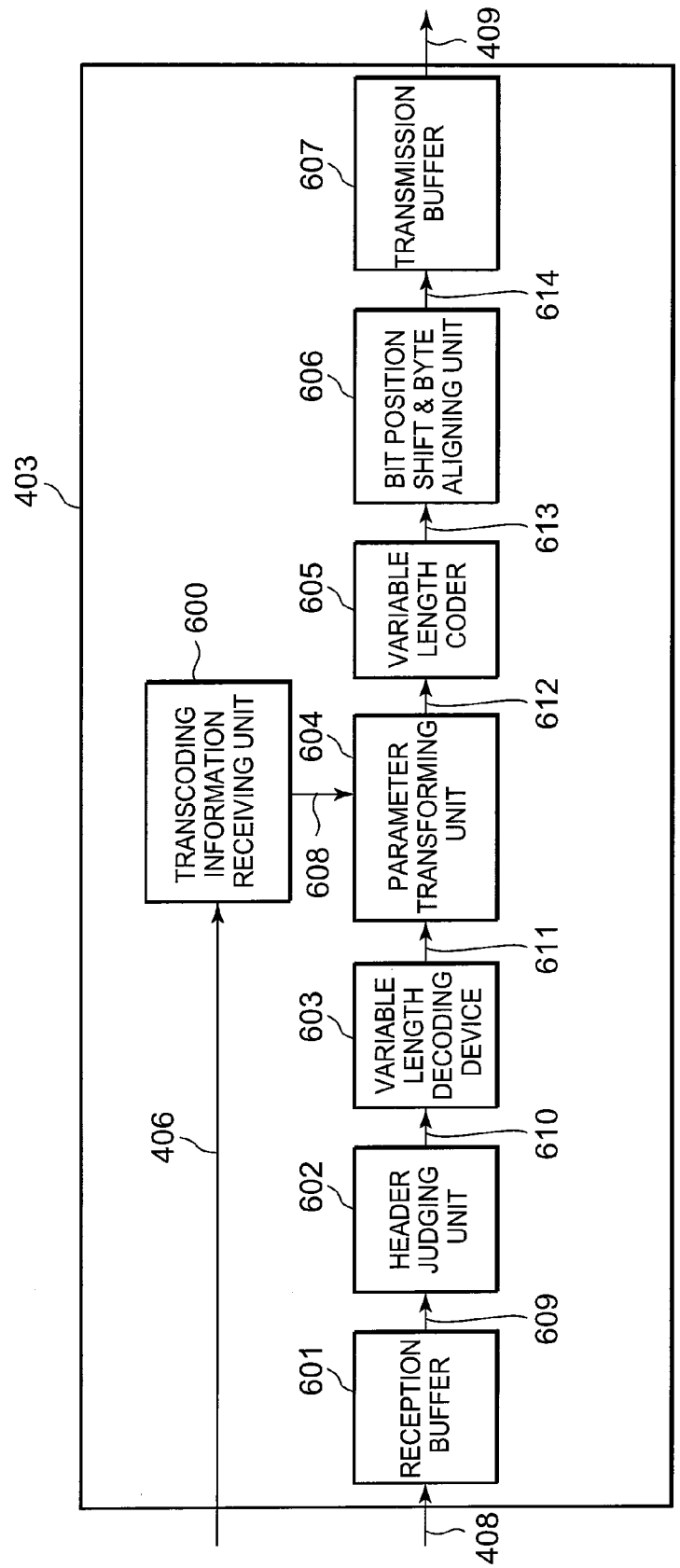
FIG. 10 is an internal structural diagram of a stream transcoding unit shown in FIG. 9.
Figure 11:
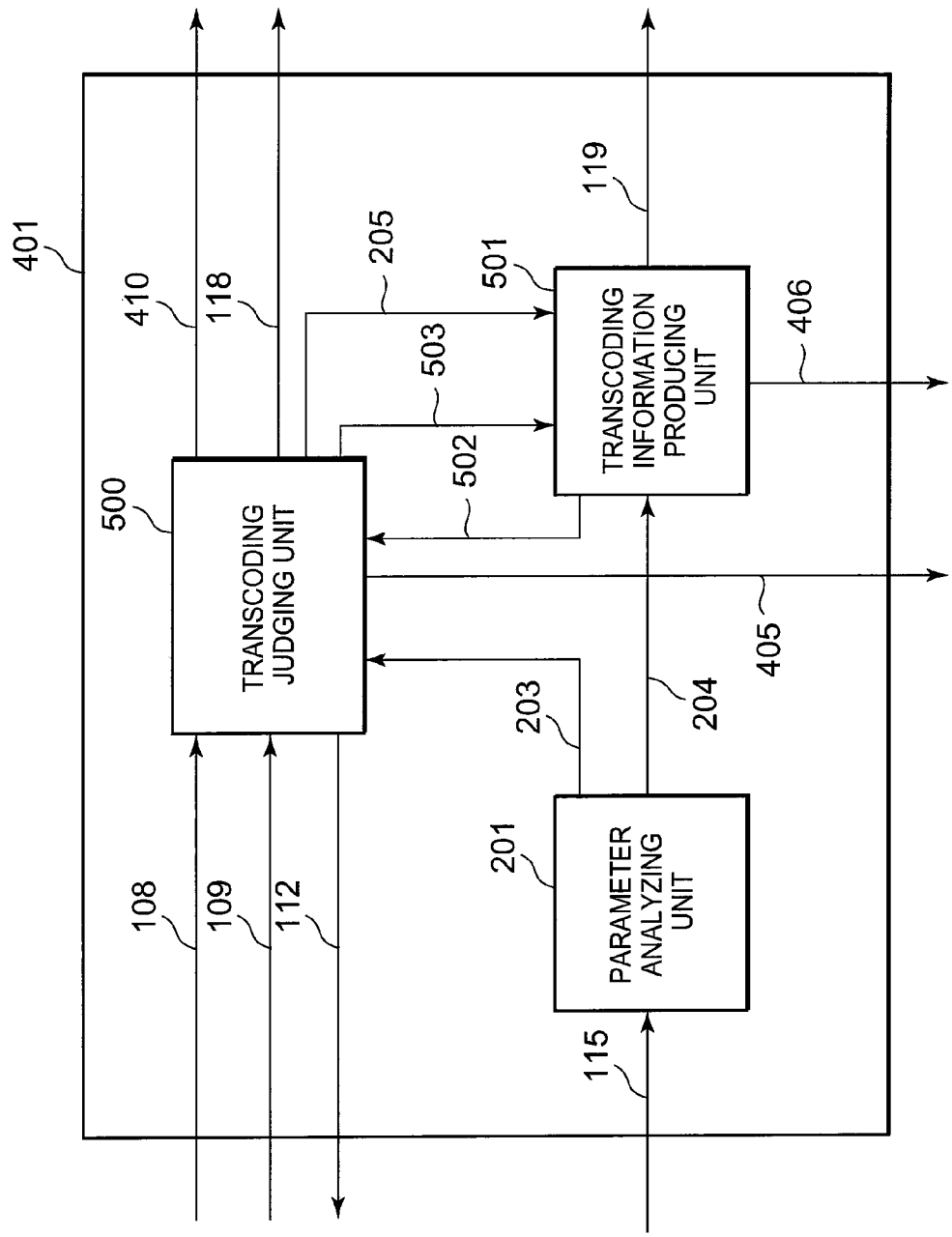
FIG. 11 is an internal structural diagram of a transcoding control unit shown in FIG. 9.

FIG. 9 is a diagram indicating an internal arrangement of a moving picture transcoding apparatus according to the second embodiment of this invention. FIG. 10 is an internal structural diagram of a stream transcoding unit shown in FIG. 9. FIG. 11 is an internal structural diagram of a transcoding control unit indicated in FIG. 9.

As shown in FIG. 9, in comparison with the first embodiment, a stream transcoding unit 403 has been added. As indicated in FIG. 10, a transcoding information receiving unit 600, a reception buffer 601, a header judging unit 602, a variable length decoding device 603, a parameter transcoding unit 604, a variable length coder 605, a bit position shift & byte aligning unit 606, and a transmission buffer 607 have been provided in the stream transcoding unit 403.

The transcoding information receiving unit 600 receives, from the transcoding control unit 401, transcoding parameter information 406 which is required to be transcoded, and then, notifies information such as a frame number, time information, a reference frame number, and a frame type to the parameter transcoding unit 604. The reception buffer 601 receives an input image stream 408 from the reception buffer 102, and then, transmits the received input image stream 408 to the header judging unit 602.

Also, the header judging unit 602 detects a slit for each frame, or for each slice with respect to an input image stream 609 received from the reception buffer 601. The variable length decoding device 603 decodes header information of an image stream 610 for each frame, or for each slice, which is received from the header judging unit 602. The parameter transcoding unit 604 transcodes, for example, the frame number and the time information, which are contained in the header information 611 of the input image received from the variable length decoding device 603, into parameters received from the transcoding information receiving unit 600. The variable length coder 605 variable-length-codes transcoded header information 612 which is received from the parameter transcoding unit 604.

The bit position shift & byte aligning unit 606 shifts a bit position of a parameter subsequent to the above-mentioned parameter which has been transcoded by the parameter transcoding unit 604 after the variable-length-coded header information 613 has been received. Also, the bit position shift & byte aligning unit 606 performs an aligning process with respect to a last byte for each slice, or for each frame so as to produce an image stream 614 in which only the header portion thereof has been transcoded. The transmission buffer 607 outputs the image stream 614 received from the bit position shift & byte aligning unit 606 via the switch-2 404 to the transmission buffer 107.

Also, as shown in FIG. 11, in the case where in the transcoding control unit 401, a succeeding frame has not referred to a frame preceding a first frame, if input stream image information is required to be transcoded, then the transcoding information producing unit 501 notifies a transcoding require/not require confirming request 502 for requiring input stream image information with respect to a transcoding judging unit 500. The transcoding judging unit 500 notifies a transcoding require/not require confirmed result notification 503 of the input stream image information.

Next, a description is made of operations of the moving picture transcoding apparatus according to the second embodiment.

[Operations]

Figure 12:
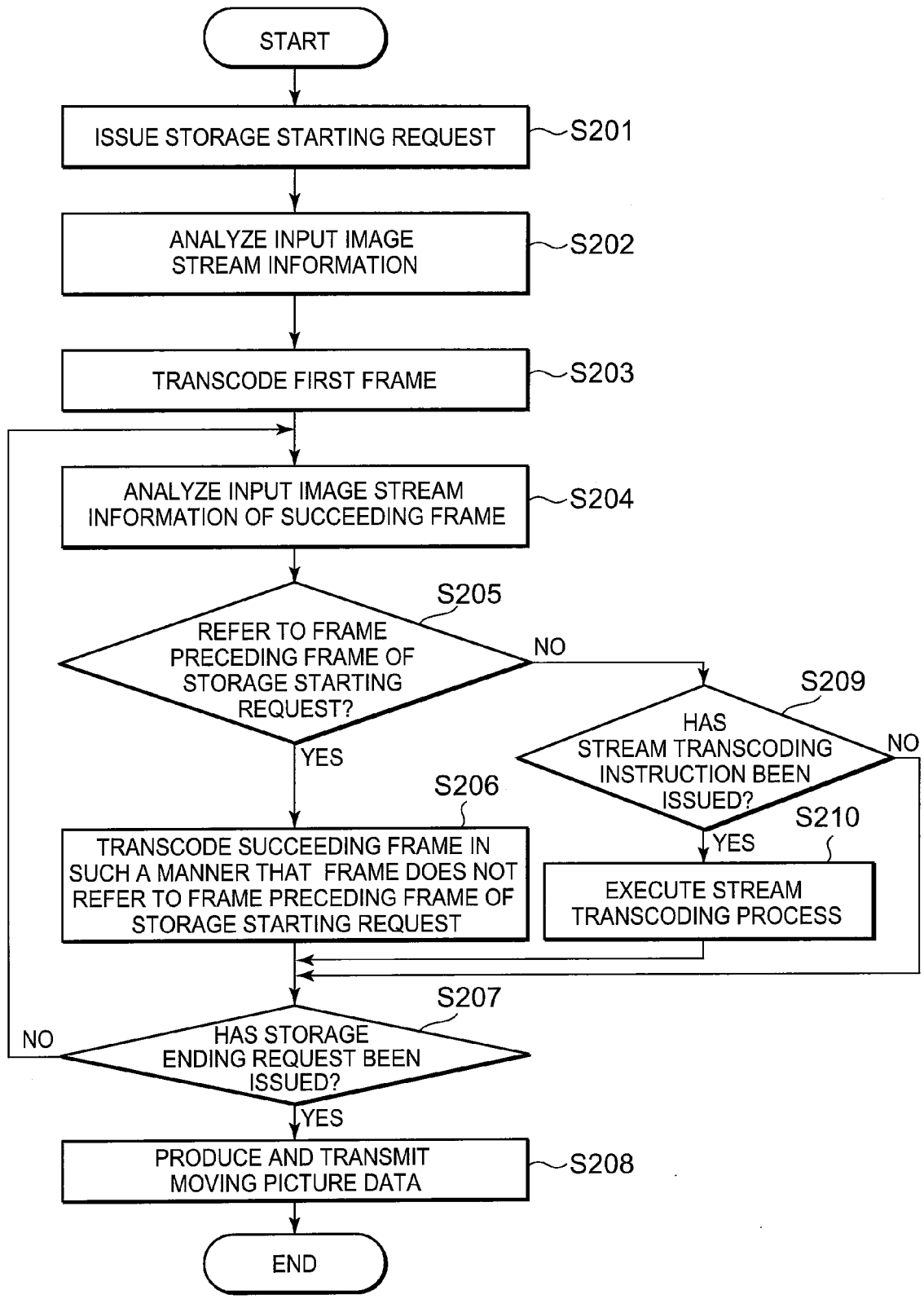
FIG. 12 is a flow chart for showing one example of operations of the moving picture transcoding apparatus according to the second embodiment.

FIG. 12 is a flow chart indicating one example of operations of the moving picture transcoding apparatus according to the second embodiment. A difference from the operations of the moving picture transcoding apparatus according to the first embodiment shown in FIG. 8 is given as follows: that is, contents of processing subsequent to the operation executed when the succeeding frame has not referred to the frame preceding the frame of the storage starting request ("NO" in Step S205) are different from those of the first embodiment. In this case, the transcoding judging unit 500 shown in FIG. 11 notifies a signal 503 of the input stream image information to the succeeding frame transcoding information producing unit 2022 of a transcoding information producing unit 501; and when the succeeding frame transcoding information producing unit 2022 issues an instruction to the stream transcoding unit 403 ("YES" in Step S209), a stream transcoding processing is carried out (Step S210).

The reception buffer 601 of the stream transcoding unit 403 receives the input image stream 408 from the reception buffer 102, and then transmits the received input image stream 408 to the header judging unit 602.

Also, the header judging unit 602 detects a slit for each frame, or for each slice with respect to the input image stream 609 received from the reception buffer. As previously described, the variable length decoding device 603 decodes the header information of the image stream 610 for each frame, or for each slice, which is received from the header judging unit 602. The parameter transcoding unit 604 transcodes, for example, the frame number and the time information, which are contained in the header information 611 of the input image received from the variable length decoding device 603, into parameters received from the transcoding information receiving unit 600. The variable length coder 605 variable-length-codes transcoded header information 612 which is received from the parameter transcoding unit 604.

The bit position shift & byte aligning unit 606 shifts a bit position of a parameter subsequent to the above-mentioned parameter which has been transcoded by the parameter transcoding unit 60 after the variable-length-coded header information 613 has been received. Also, the bit position shift & byte aligning unit 606 performs an aligning process with respect to a last byte for each slice, or for each frame so as to produce an image stream 614 in which only the header portion thereof has been transcoded. The transmission buffer 607 outputs the image stream 614 received from the bit position shift & byte aligning unit 606 via the switch-2 404 to the transmission buffer 107.

As previously described, in the moving picture transcoding apparatus of the second embodiment of this invention, even when the first frame is changed, only the header information such as the sequence of the frame number and the time information about the succeeding frame can be corrected, while this succeeding frame need not be again encoded. As a consequence, for example, such a new moving picture data in which the sequence number or the like of the frame has been corrected can be obtained.

Third Embodiment

[Structure]

Next, a description is made of a third embodiment of this invention. It should be noted that although internal arrangements of the first embodiment and the third embodiment of this invention are partially different from each other, other arrangements thereof are substantially equal to each other. Accordingly, the same reference numerals of the first embodiment will be employed as those for denoting the same structural elements of the third embodiment, and descriptions thereof will be omitted, and further, the arrangements different from those of the first embodiment will be described in detail.

In the third embodiment of this invention, a maximum reference frame number is defined, while this maximum reference frame number indicates that a succeeding frame can refer to predetermined frames from a specific frame. The parameter analyzing unit 201 shown in FIG. 3 calculates a maximum reference frame number based upon decoded information which is received from the header decoding unit 103. This parameter analyzing unit 201 performs a counting operation after a first frame of a stored image has been produced until streams up to the maximum reference frame number are received. Then, when streams defined from the first frame of the stored image until a plurality of frames smaller than the maximum reference frame number are received, the parameter analyzing unit 201 notifies such a request that a transcoding is required to the transcoding judging unit 200. In other words, such a succeeding frame which exceeds the maximum reference frame number does not refer to a frame preceding the first frame, so this succeeding frame is directly stored in the transmission buffer 107.

Next, a description is made of operations of the moving picture transcoding apparatus according to the third embodiment.

[Operations]

Figure 13:
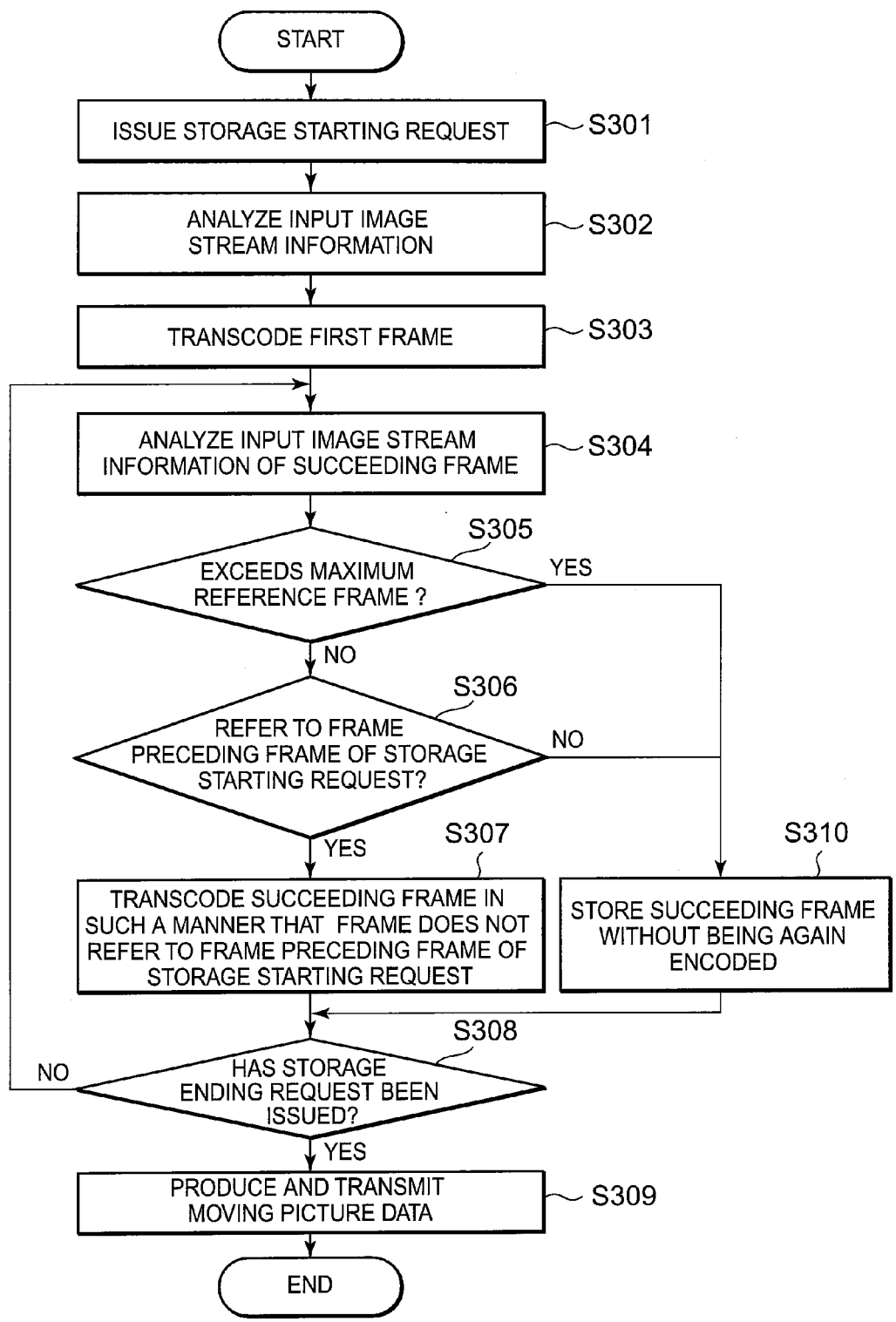
FIG. 13 is a flow chart for showing one example of operations of a moving picture transcoding apparatus according to a third embodiment of this invention.

FIG. 13 is a flow chart indicating one example of operations of the moving picture transcoding apparatus according to the third embodiment. A difference from the flow chart of the first embodiment shown in FIG. 8 is such an operation that only a processing for checking the above-mentioned maximum reference frame is conducted. In this embodiment, for instance, the maximum reference frame number is assumed as 4.

In the flow chart shown in FIG. 13, processings from a Step S301 to a Step S304 are similar to those from the Step S101 to the Step S104 shown in FIG. 8. In the case where frame numbers are smaller than the maximum reference frame number from the first frame of the stored image ("No" in Step S305), the transcoding judging unit 200 judges whether or not the succeeding frame has referred to the frame preceding the storage starting frame (namely, first frame) based upon the analysis result of the parameter analyzing unit 201 (Step S306). It should also be noted that processings from the subsequent Step S307 to a Step S309 are similar to those of the first embodiment.

On the other hand, in the case where a maximum reference frame number from the first frame of the stored image is equal to or larger than 4 ("No" in Step S305), the succeeding frame which corresponds to the present transcoding subject no longer refers to a preceding frame which exceeds the first frame. As a result, the processing routine is advanced to a Step S310 in which the above-mentioned succeeding frame is defined as a succeeding frame without being again encoded (Step S310).

Thereafter, a storage ending request is not issued ("No" in Step S308), and even when the processing routine is returned to the processing of the Step S304, the succeeding frame has exceeded the maximum reference frame number, so the processing routine is advanced to the processing of the Step S310. When the transcoding judging unit 200 accepts a storage ending request signal ("Yes" in Step S308), the moving picture transcoding apparatus 100 produces moving picture data in the transmission buffer 107, and then, transmits the produced moving picture data (Step S309).

As a result, if the maximum reference frame number can be grasped, then such a frame which succeeds the maximum frame number from the frame of the storage starting request does not refer to the frame preceding the above-mentioned designated frame. As a consequence, in accordance with the moving picture transcoding apparatus of the third embodiment of this invention, when the succeeding frame exceeds the maximum reference frame number, both the judging operation defined in the Step S306 and the subsequent frame transcoding processing defined in the Step S307 are no longer performed, so a total calculation amount thereof can be reduced.

Fourth Embodiment

[Structure]

Next, a description is made of a fourth embodiment of this invention. It should be noted that although internal arrangements of the first embodiment and the fourth embodiment of this invention are partially different from each other, other arrangements thereof are substantially equal to each other. Accordingly, the same reference numerals of the first embodiment will be employed as those for denoting the same structural elements of the fourth embodiment, and descriptions thereof will be omitted, and further, the arrangements different from those of the first embodiment will be described in detail. In the fourth embodiment of this invention, the functions of the second and third embodiments have been combined with the structure of the first embodiment.

Next, a description is made of operations of the moving picture transcoding apparatus according to the fourth embodiment.

[Operations]

Figure 14:
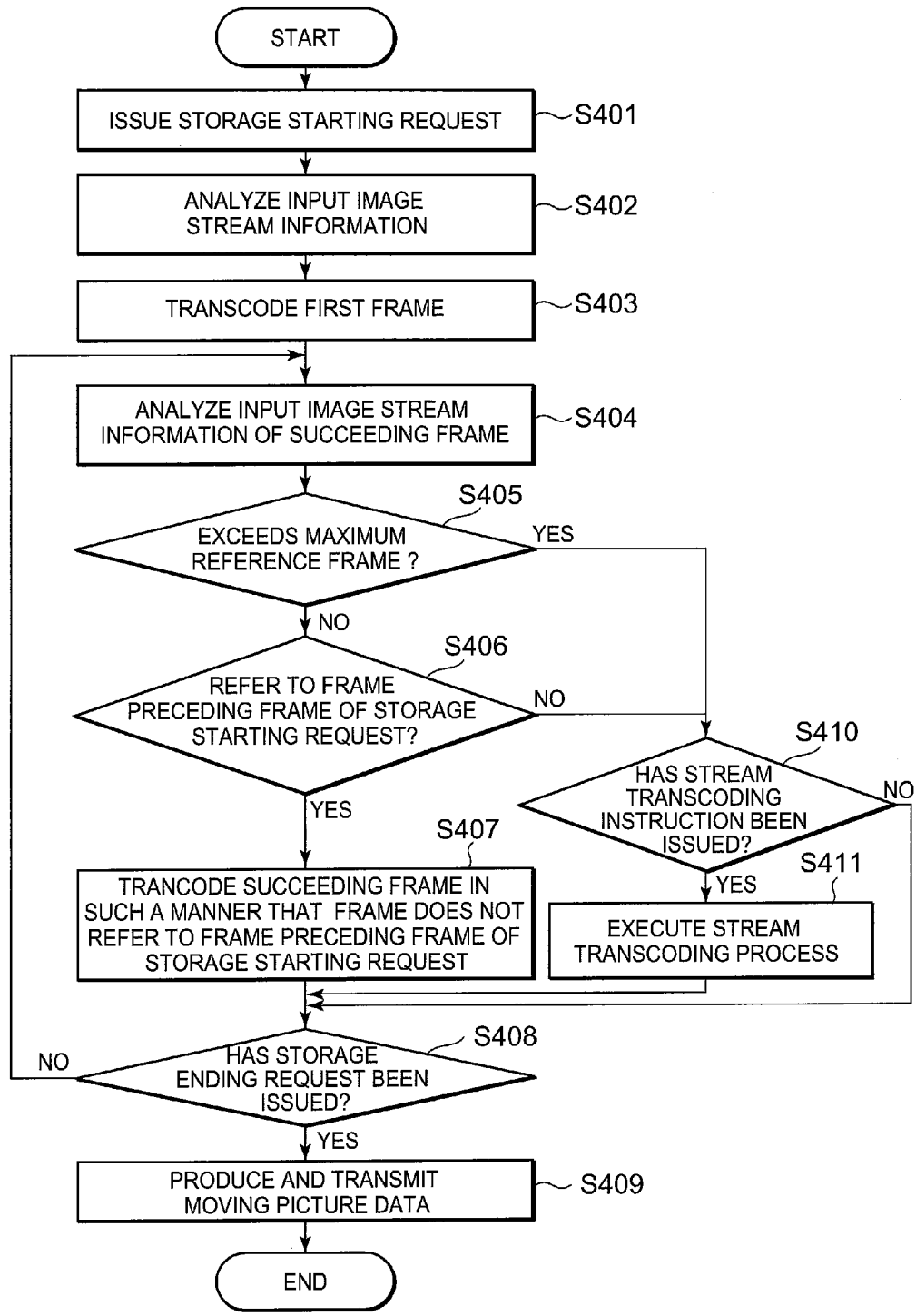
FIG. 14 is a flow chart for showing one example of operations of a moving picture transcoding apparatus according to a fourth embodiment of this invention.

FIG. 14 is a flow chart indicating one example of operations of the moving picture transcoding apparatus according to the fourth embodiment. A difference from the operations of the moving picture transcoding apparatus according to the first embodiment shown in FIG. 8 is given as follows: that is, both the above-mentioned stream transcoding processing function and checking function for the maximum reference frame have been added.

When the transcoding judging unit 200 accepts a storage starting request (Step S401), the transcoding judging unit 200 analyzes input image stream information (Step S402), and then executes a first frame transcoding processing (Step S403). Subsequently, the transcoding judging unit 200 analyzes input image stream information about a succeeding frame (Step S403), so the processing for checking the maximum reference frame is carried out which has been described in the third embodiment (Step S405). When a succeeding frame exceeds the maximum reference frame ("YES" in Step S406), and then, a stream transcoding instruction is further issued (Step S410), the stream transcoding processing (Step S411) is carried out, which has been described in the second embodiment. Since subsequent processings are similar to those of the first embodiment, those processings are omitted.

As previously described, in the moving picture transcoding apparatus according to the fourth embodiment of this invention, the deterioration of the image quality of the moving picture data can be suppressed, and the calculation amount required for encoding the moving picture data can be reduced. Also, the header information such as the sequence of the frame number and the time information with respect to the succeeding frame can be corrected, while this succeeding frame is no longer again encoded. Further, since the maximum reference frame number is considered, such a processing that the frames exceeding the maximum reference frame number refer to the frame preceding the storage starting frame is no longer carried out, so the calculation amount required for this processing can be reduced.

Fifth Embodiment

[Structure]

Next, a description is made of a fifth embodiment of this invention. It should be noted that although internal arrangements of the second embodiment and the fifth embodiment of this invention are partially different from each other, other arrangements thereof are substantially equal to each other. Accordingly, the same reference numerals of the second embodiment will be employed as those for denoting the same structural elements of the fifth embodiment, and descriptions thereof will be omitted, and further, the arrangements different from those of the second embodiment will be described in detail. In the fifth embodiment of this invention, when a first frame is an IDR frame in a first frame transcoding processing, the above-mentioned first frame is directly used without being transcoded.

[Operations]

A description is made of the fifth embodiment with reference to the flow chart indicating one example of image transcoding operations of the moving picture transcoding apparatus according to the second embodiment of this invention, shown in FIG. 12. A difference from the operations between the fifth embodiment and the second embodiment is given as follows: that is, contents of the first frame transcoding processings (Step S203) are different from each other. Hereinafter, a description is made of the first frame transcoding processing.

When the transcoding judging unit 500 shown in FIG. 11 receives a storage starting request 108, the transcoding judging unit 500 requests the parameter analyzing unit 201 to confirm whether or not the present frame corresponds to an intra-frame. Also, when the transcoding judging unit 500 receives such a notification that the present frame is the intra-frame from the parameter analyzing unit 201, the transcoding judging unit 500 requests the encoding unit 105 shown in FIG. 9 to acquire latest image data from the video coding layer decoding unit 104 and then store the acquired latest image data into the frame memory 305.

Upon receipt of such a request for confirming whether or not the present frame is the intra-frame from the transcoding judging unit 500, the parameter analyzing unit 201 notifies a confirmation result to the transcoding judging unit 500. Then, in such a case that the present frame corresponds to the intra-frame, the transcoding judging unit 500 notifies the information of the present frame to the transcoding information producing unit 501. The first frame transcoding information producing unit 2021 produces such an information required to become a first frame of a stored image within the control information of the intra-frame based upon the information supplied from the parameter analyzing unit 201.

As the information required to become the first frame of the stored image, for example, the following information is conceivable: information for judging whether or not a frame buffer is initialized; information for guaranteeing that a succeeding frame has not referred to a frame preceding the relevant frame; and so on.

Then, the first frame transcoding information producing unit 2021 notifies the transcoding parameter information 406 to the transcoding information receiving unit 600 of the stream transcoding unit 403.

The transcoding information receiving unit 600 receives the transcoding parameter information 406, and then, notifies the received transcoding parameter information 406 to the parameter transcoding unit 604. Then, the parameter transcoding unit 604 executes such a processing that a frame number within the input image stream information of the first frame is transcoded to a first number. In subsequent processings, as previously described, the stream transcoding unit 403 produces an image stream 614 of a first frame in which only the header portion thereof has been transcoded via the variable length coder 605 and the bit position shift & byte aligning unit 606. In this case, while a data portion of the first frame is not again encoded, the first frame is transcoded.

The transmission buffer 607 outputs the image stream 614 of such a first frame that only the head portion thereof has been transcoded to the transmission buffer 107. Since other processings of the fifth embodiment are similar to those of the second embodiment, descriptions thereof will be omitted.

As previously described, in such a case where the frame of the storage starting request corresponds to the first frame formed by the intra-prediction, this frame can be directly diverted. As a result, the moving picture transcoding apparatus 400 need not again encode the entire frame of the storage starting request, so the calculation amount thereof can be reduced.

Sixth Embodiment

[Structure]

Next, a description is made of a sixth embodiment of this invention. It should be noted that although internal arrangements of the first embodiment and the sixth embodiment of this invention are partially different from each other, other arrangements thereof are substantially equal to each other.

Accordingly, the same reference numerals of the first embodiment will be employed as those for denoting the same structural elements of the sixth embodiment, and descriptions thereof will be omitted, and further, the arrangements different from those of the first embodiment will be described in detail.

In the sixth embodiment of this invention, when a succeeding frame has referred to a partial block of a frame preceding a specific frame, only this partial block is encoded.

Figure 15:
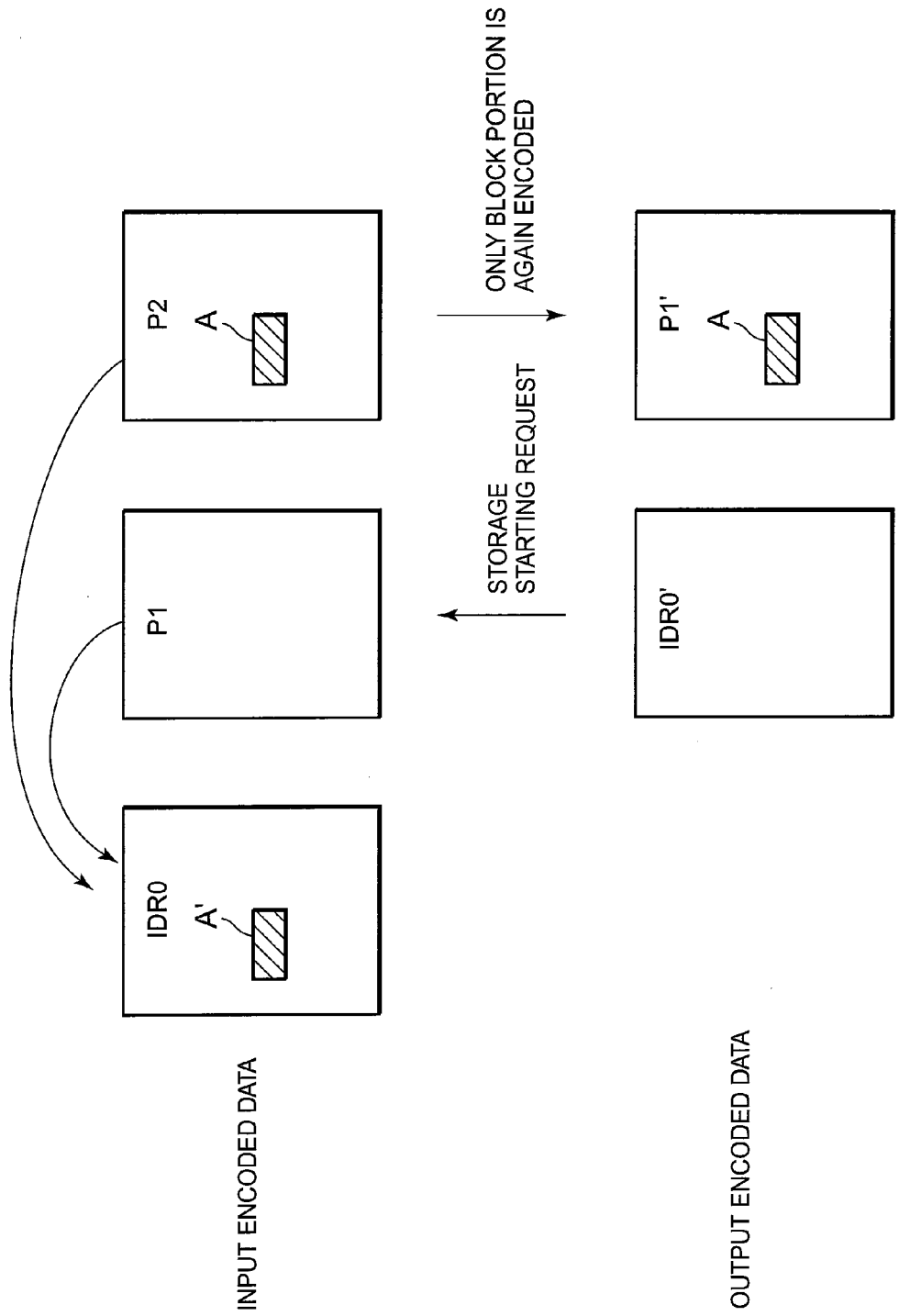
FIG. 15 is a diagram for describing one example of a moving picture transcoding method executed by a moving picture transcoding apparatus according to a sixth embodiment of this invention.

FIG. 15 is a diagram describing one example of a moving picture transcoding method executed by the moving picture transcoding apparatus according to the sixth embodiment of this invention. In FIG. 15, in such a case that a partial block of a P2 frame has referred to a partial block of an IDR0 frame, when the P2 frame is again encoded, only a block portion of this P2 frame is encoded, and other portions thereof are not again encoded, but encoded data of the P2 frame is directly diverted.

[Operations]

A description is made of the sixth embodiment of this invention with reference to the flow chart of FIG. 8 which indicates one example as to the image transcoding operation by the moving picture transcoding apparatus according to the first embodiment of this invention. A difference between the first embodiment and the sixth embodiment is in processings for transcoding a succeeding frame (defined subsequent to Step S104). Hereinafter, a description is made of this succeeding frame transcoding processing. In the case where the succeeding frame has referred to a frame preceding a frame of a storage starting request ("YES" in Step S105), a succeeding frame transcoding processing defined in the Step S106 is carried out.

In this case, if a succeeding frame to be transcoded corresponds to only a partial block of the frame preceding the frame of the storage starting request, then the succeeding frame to be transcoded refers only to this partial block of the preceding frame, and is encoded in the encoding unit 105, while other portions of this preceding frame are not again encoded. As a consequence, the calculation amount can be reduced, as compared with that of another encoding operation in which the entire frame is again encoded.

Referring now to FIG. 1, FIG. 3, and FIG. 5, a specific operation will be described. The transcoding judging unit 200 shown in FIG. 3 receives the analysis result notification 203 from the parameter analyzing unit 201, while the analysis result notification 203 indicates whether or not the transcoding is required in the unit of the slice. At this time, a range for requiring the transcoding is acquired based upon, for instance, a macroblock number. Then, when the transcoding is required, the transcoding judging unit 200 issues the image data acquiring request 118 in combination with information about a macroblock number of the relevant slice to instruct the encoding unit 105 shown in FIG. 1 to acquire the latest image data produced by the video coding layer decoding unit 104.

Also, the parameter analyzing unit 201 notifies, for instance, a macroblock number of a slice which is required to be transcoded to the transcoding information producing unit 202.

Based upon the macroblock information received from the parameter analyzing unit 201, the transcoding information producing unit 202 produces information required for producing a header (for instance, head macroblock number of slice), and then, notifies transcoding parameter information to the encoding unit 105.

Also, the switch-1 301 of the encoding unit 105 shown in FIG. 5 is switched in such a manner that in response to the image data acquiring request 118 issued from the transcoding judging unit 200, the latest image data produced by the video coding layer decoding unit 104 is acquired. Since the switch-1 301 receives the macroblock number which should be transcoded from the transcoding judging unit 200, the encoding unit 105 transcodes only a position of a designated macroblock number within the latest image data.

Further, the header information producing unit 300 produces header information based upon the information received from the transcoding control unit 101, and then, outputs the produced header information to the variable length coder 304. With respect to image data which corresponds to a macroblock, this image data is encoded by performing the above-mentioned inter-prediction so as to obtain encoded data. The encoded data is transmitted to the transmission buffer 107.

When the reception buffer 102 indicated in FIG. 1 accepts such an instruction from the transcoding control unit 101 that this reception buffer 102 outputs an image stream to the transmission buffer 107, the reception buffer 102 transmits the input image stream to the transmission buffer 107 for each slice.

As previously described, in the moving picture transcoding apparatus of the sixth embodiment of this invention, only the encoded data of such a partial area of a succeeding frame can be merely again encoded, so the calculation amount thereof can be reduced, while the succeeding frame is judged in such a manner that this succeeding frame has referred to the frame preceding the frame of the storage starting request.

Seventh Embodiment

[Structure]

Next, a description is made of a seventh embodiment of this invention. It should be noted that although internal arrangements of the sixth embodiment and the seventh embodiment of this invention are partially different from each other, other arrangements thereof are substantially equal to each other. Accordingly, the same reference numerals of the sixth embodiment will be employed as those for denoting the same structural elements of the seventh embodiment, and descriptions thereof will be omitted, and further, the arrangements different from those of the sixth embodiment will be described in detail.

In the seventh embodiment, in such a case where a succeeding frame has referred to a partial block of a frame preceding the succeeding frame and also referred to a partial block of a frame preceding a specific frame, when the referring blocks can establish a correlation, while the succeeding block refers to both the partial block of the frame preceding the specific frame and also the partial block of the frame preceding the succeeding frame, this succeeding frame is again encoded.

Figure 16:
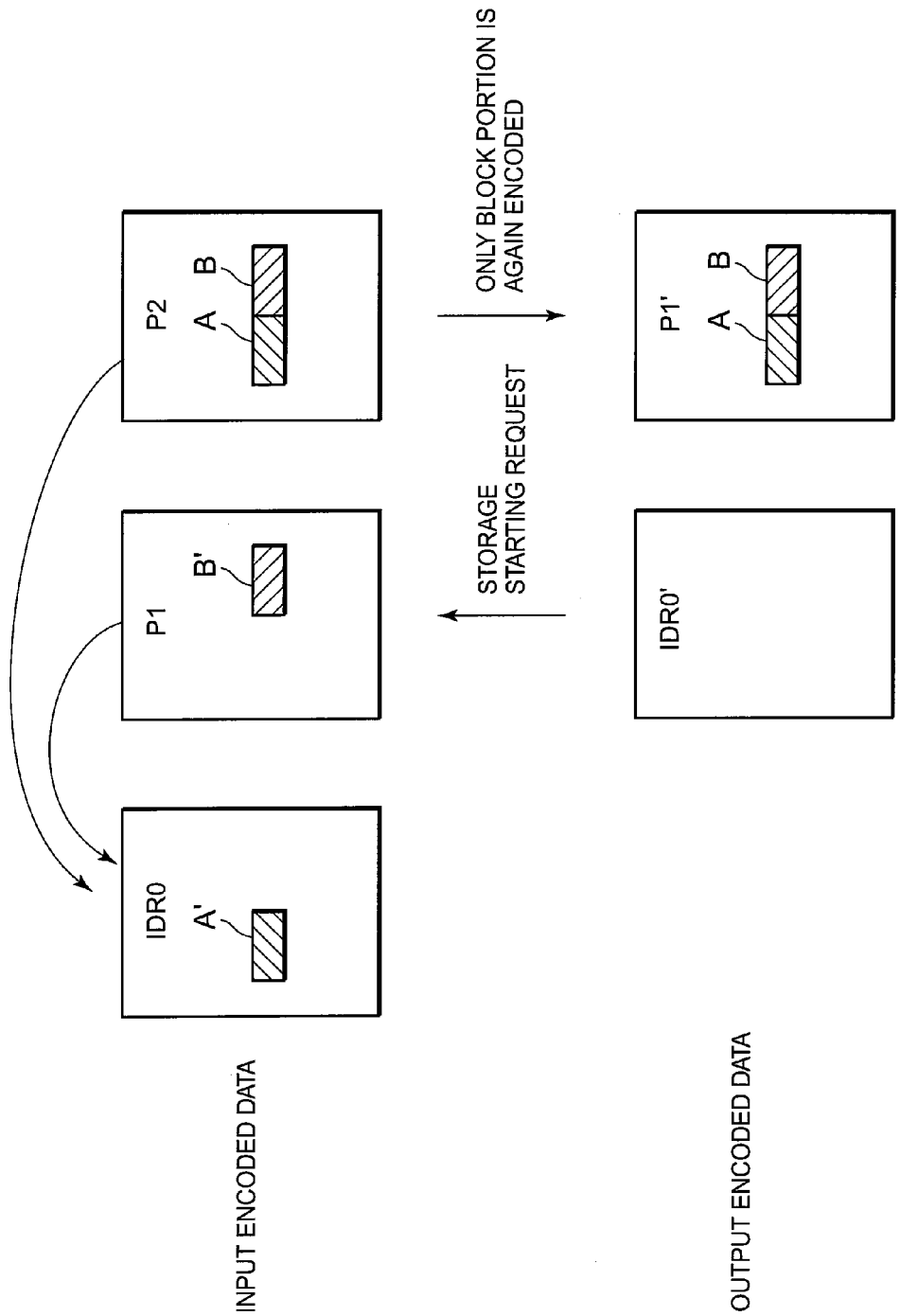
FIG. 16 is a diagram for describing one example of a moving picture transcoding method executed by a moving picture transcoding apparatus according to a seventh embodiment of this invention.

FIG. 16 is a diagram describing one example of a moving picture transcoding method executed by the moving picture transcoding apparatus according to the seventh embodiment of this invention. As represented in FIG. 16, a partial block A of a P2 frame refers to a partial block A' of an IDR0 frame, whereas a partial block B of the P2 frame refers to a partial block B' of the P1 frame.

Figure 17:
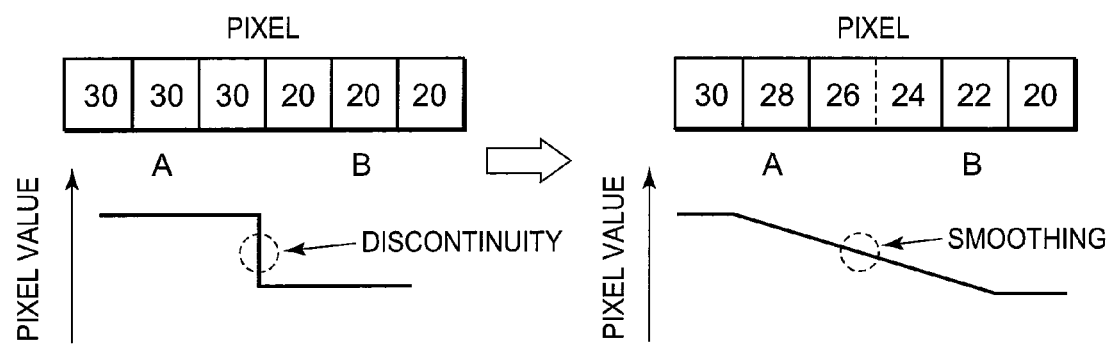
FIG. 17 is a diagram for describing one example of presence and absence of a correlation between blocks.

FIG. 17 is an explanatory diagram explaining one exempt for checking whether or not there is a correlation between blocks. A block A is constructed of 3 pixel values, and a block B is constructed of 3 pixel values. In the seventh embodiment, a filtering process is carried out in order to smooth a discontinuity between the blocks. In this filtering process, the discontinuity is smoothed by employing pixel values of the block A and the block B (left of FIG. 17), so pixel values of the block A and the block B are obtained (right of FIG. 17).

In this case, the block A depends upon the value of the block B, and the block B also depends upon the value of the block A. The above-mentioned relationship where the respective blocks depend upon each other corresponds to one example about such a case that the correlation is established, which is described in this invention. In this case, since such a block to which the block A has referred corresponds to the block A' of the IDR frame whereas a block to which the block B has referred corresponds to the block B' of the P1 frame, when the P2 frame is encoded, while the P2 frame refers to both the block A' and the block B', this P2 is encoded. It should also be noted that the information for indicating whether or not the correlation is established is recorded in the header portion.

[Operations]

Figure 18:
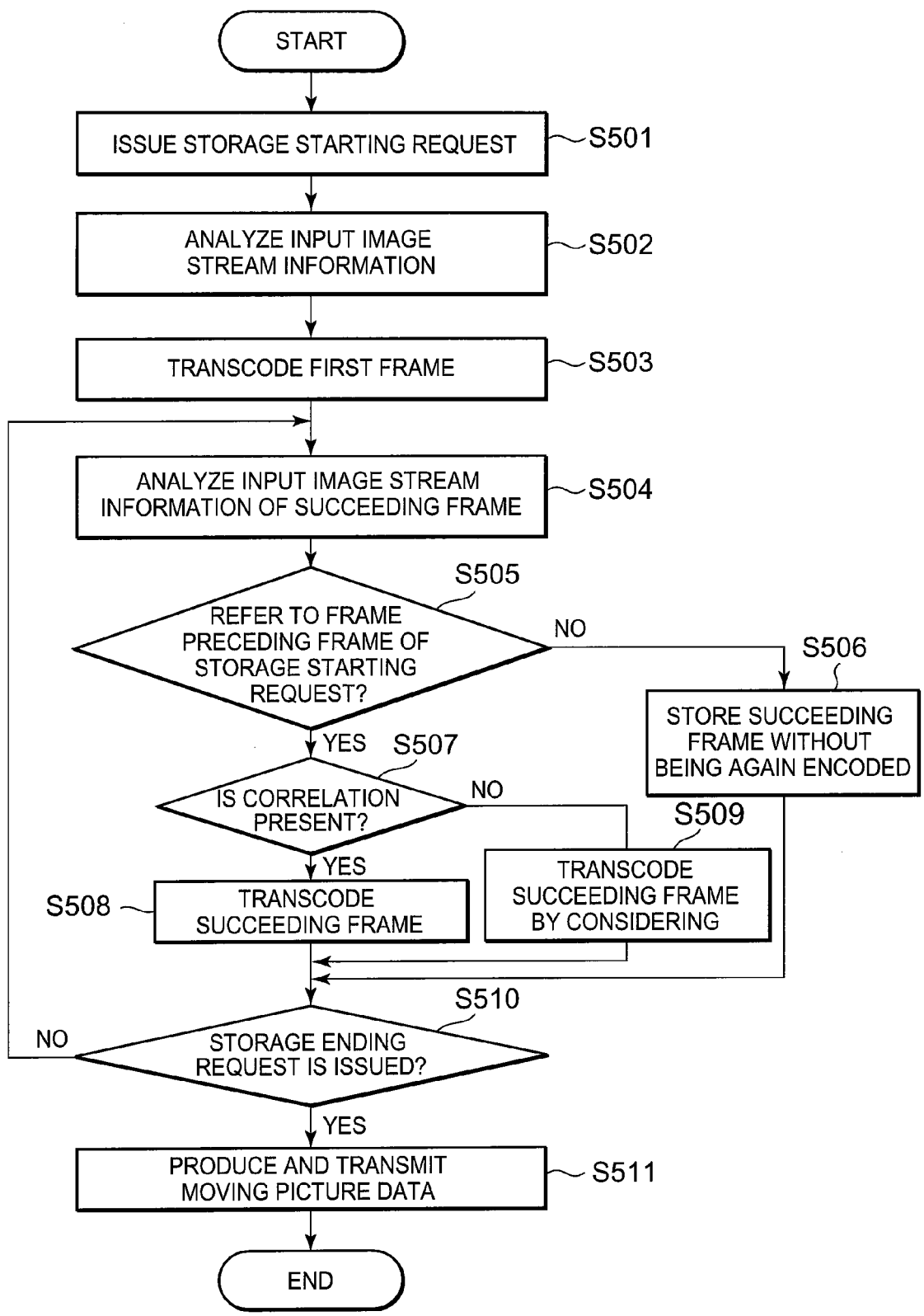
FIG. 18 is a flow chart for showing one example of operations of the moving picture transcoding apparatus according to the seventh embodiment.

FIG. 18 is a flow chart indicating one example of operations of the moving picture transcoding apparatus according to the seventh embodiment. It should be noted that processings defined after a storage starting request has been accepted (Step S501) up to a processing for transcoding heat frame (Step S504) are similar to the processings of the sixth embodiment.

In the seventh embodiment, in a processing for analyzing input image stream information of a succeeding frame, when a frame which should be transcoded has referred to a macroblock of a frame preceding a storage starting request ("Yes" in Step S505), the parameter analyzing unit 201 judges whether or not such a macroblock of another frame is present by referring to the header information, which has a correlation with the macroblock of the frame preceding the frame of the storage starting request. Then, the parameter analyzing unit 201 notifies the judged result to the transcoding judging unit 500. When the macroblock of another frame has no correlation ("No" in Step S508), subsequent processings are similar to those of the sixth embodiment.

On the other hand, as described in FIG. 17, in such a case where the macroblock of another frame is present which has the correlation of mutual influence with the macroblock of the frame preceding the frame of the storage starting request ("Yes" in Step S509), the macroblocks to which the frame to be transcoded refers are again encoded with each other. Specifically, the transcoding information producing unit 202 produces the below-mentioned information based upon the macroblock information received from the parameter analyzing unit 201, and then, notifies the transcoding parameter information to the encoding unit 105. The above-mentioned information is required so as to produce a header such as a head macroblock number of a slice.

Also, the switch-1 301 of the encoding unit 105 shown in FIG. 3 is switched in such a manner that the latest image data produced by the video coding layer decoding unit 104 is acquired in response to the image data acquiring request 118 issued from the transcoding judging unit 200. Since the switch-1 301 receives the macroblock number having the transcoding correlation from the transcoding judging unit 200, the encoding unit 105 transcodes only the position of the macroblock number having the designated correlation within the latest image data.

The header producing unit 300 produces header information based upon the information received from the transcoding control unit 501, and then, outputs the header information to the variable length coder 304. With respect to image data corresponding to the macroblock, this image data is encoded into encoded data by performing the above-mentioned inter-prediction. The encoded data is transmitted to the transmission buffer 107.

Upon receipt of such an instruction that the image stream is outputted from the transcoding control unit 101 to the transmission buffer 107, the reception buffer 102 shown in FIG. 1 transmits the input image stream to the transmission buffer 107 for each slice.

As previously described, in the moving picture transcoding apparatus according to the seventh embodiment of this invention, the partial area of another frame having the correlation with the partial area of the frame preceding the frame of the storage starting request is again encoded under such a condition that the correlation is maintained. Accordingly, distortion or the like of the image of the partial area of the frame which has been again encoded does not occur.

Eighth Embodiment

Next, a description is made of an eighth embodiment of this invention. In the eighth embodiment, the function capable of correcting the header information such as the sequence of the frame number and the time information, as described in the second embodiment, is additionally provided in the moving picture transcoding apparatus of the seventh embodiment. It should be noted that since the correcting function for the header information has already been described, the description thereof will be omitted.

Since the moving picture transcoding apparatus according to the eighth embodiment of this invention transcodes only the partial area of the frame, the calculation amount thereof can be reduced, as compared with the case where the entire area of the frame is transcoded, and further, the header information such as the time information and the header number can be corrected.

Ninth Embodiment

Next, a description is made of a ninth embodiment of this invention. IN the ninth embodiment, the function capable of checking the maximum reference frame, as described in the third embodiment, is additionally provided in the moving picture transcoding apparatus of the seventh embodiment. It should be noted that since the function for checking the maximum reference frame has already been described, the description thereof will be omitted.

Since the moving picture transcoding apparatus according to the ninth embodiment of this invention transcodes only the partial area of the frame, the calculation amount thereof can be reduced, as compared with the case where the entire area of the frame is transcoded, and further, as to the frames which exceed the maximum reference frame number, the processing required in which the succeeding frame refers to the frame preceding the storage starting frame is no longer performed, so the calculation amount thereof can be reduced.

Tenth Embodiment

Next, a description is made of a tenth embodiment of this invention. In the tenth embodiment, both the correcting function of the header information and the checking function of the maximum reference frame are additionally provided in the moving picture transcoding apparatus of the seventh embodiment. It should be noted that since the correcting function of the header information and the checking function of the maximum reference frame have already been described, the descriptions thereof will be omitted.

Since the moving picture transcoding apparatus according to the tenth embodiment of this invention transcodes only the partial area of the frame, the calculation amount thereof can be reduced, as compared with the case where the entire area of the frame is transcoded, and further, the header information such as the time information and the header number can be corrected. In addition, as to the frames which exceed the maximum reference frame number, the processing required in which the succeeding frame refers to the frame preceding the storage starting frame is no longer performed, so the calculation amount thereof can be further reduced.

As previously described, in this invention, the below-mentioned effects can be achieved. As a first effect, it is possible to provide the transcoding system capable of producing the moving picture data having the high image quality by suppressing the deterioration of the image quality in the case where the frames are stored from the designated frame with respect to the entered encoded data.

As a second effect, it is possible to provide the transcoding system capable of producing the moving picture data in high speed and capable of reducing the calculation amount in the case where the frames are stored from the designated frame with respect to the entered encoded data.

As a third effect, it is possible to provide the transcoding system capable of producing the stored image having the high image quality in high speed in the case where the frames are stored from the designated frame with respect to the entered encoded data when the frame succeeding the first frame of the stored image has referred to the frame preceding the first frame.

As a fourth effect, it is possible to provide the transcoding system capable of producing the moving picture data having the high image quality in high speed in the case where the frames are stored from the designated frame with respect to the entered encoded data, and when the first frame of the stored image is the intra-frame, the intra-frame is directly diverted as the first frame, while the calculation amount can be reduced.

While this invention has been described with reference to the above-mentioned embodiments, this invention is not limited only to those embodiments. The structures and the detailed contents of this invention may be modified in various manners understandable by those skilled in the art within the scope of the claims.

This invention is the National Phase of PCT/JP2008/059952 filed on May 23, 2008, which claims the priority based on Japanese Patent Application No. 2007-141507 filed on May 29, 2007, all of which have been incorporated thereinto.

The invention claimed is:

1. A moving picture transcoding apparatus which transcodes encoded moving picture data, comprising:
 a moving picture data producing unit configured to produce new moving picture data in which a specific frame of the encoded moving picture data is set as a first frame thereof; and
 a judging unit configured to analyze a header portion of each frame and to judge whether or not a each succeeding frame of the specific frame has been encoded by referring to the header portion of a frame preceding the specific frame,
 wherein the moving picture data producing unit comprises:
  a first frame transcoding process unit configured to transcode the specific frame to the first frame that does not refer to another frame; and
  a succeeding frame transcoding process unit that again encodes a succeeding frame, when the judging unit judges that the succeeding frame in question refers to an frame preceding the specific frame by successively analyzing each header portion from the succeeding frame to the specific frame;
 wherein:
 the succeeding frame transcoding process unit does not perform any transcoding process when the judging unit judges that each succeeding frame does not refer to any frame preceding the specific frame, to produce each succeeding frame kept intact.

2. A moving picture transcoding apparatus according to claim 1, wherein the moving picture data producing unit does not encode again the succeeding frame and produces the succeeding frame as a succeeding frame of the new moving picture data when the judging unit judges that the succeeding frame subsequent to the specific frame refers to any other succeeding frame subsequent to the specific frame.

3. A moving picture transcoding apparatus according to claim 1, wherein the first frame transcoding process unit decodes encoded data of the specific frame, and thereafter, encodes the decoded data without referring to another frame to produce the first frame.

4. A moving picture transcoding apparatus according to claim 1, wherein, when the judging unit judges that the succeeding frame refers to the frame preceding the specific frame, the succeeding frame transcoding process unit decodes encoded data of the succeeding frame, and thereafter, performs a frame inter-prediction between the frame of the decoded data and another frame, and encodes the succeeding frame after being decoded without referring to the frame preceding the specific frame.

5. A moving picture transcoding apparatus according to claim 1, wherein when the specific frame is encoded without referring to another frame, the first frame transcoding process unit sets the specific frame as a first frame of the new moving picture data.

6. A moving picture transcoding apparatus according to claim 1, wherein the succeeding frame transcoding process unit performs the encoding by a frame intra-prediction coding or a frame inter-prediction coding.

7. A moving picture transcoding apparatus according to claim 3, wherein:
 the encoded data contains frame specific information for specifying its own frame with respect to the first frame; and
 the succeeding frame transcoding process unit rewrites only the frame specific information of the succeeding frame, which has been judged by the judging unit to refer to the frame subsequent to the specific frame.

8. A moving picture transcoding apparatus according to claim 1, wherein:
 the judging unit analyzes the header portion of each succeeding frame and judges whether or not the number of the succeeding frame reaches a maximum reference frame number from the number of the specific frame; and
 the moving picture data producing unit sets a succeeding frame as the succeeding frame of the new moving picture data without being again encoded, when the number of the succeeding frame does not reach the maximum reference frame number.

9. A moving picture transcoding apparatus according to claim 1, wherein when a partial area of the succeeding frame, which has been judged by the judging unit to refer to the frame preceding the specific frame, has been encoded by referring to a partial area of the frame preceding the specific frame, the succeeding frame transcoding process unit again encodes the succeeding frame by referring to a partial area of any one frame in a range from the judged succeeding frame to the specific frame.

10. A moving picture transcoding apparatus according to claim 9, wherein:

the judging unit judges whether or not a partial area of another frame is present, which has a correlation of mutual influence with the partial area of the frame preceding the specific frame; and in such a case where a judgment result is obtained by the judging unit which notifies that the partial area of the another frame is present, which has the correlation of mutual influence with the partial area of the frame preceding the specific frame, the succeeding frame transcoding process unit again encodes the succeeding frame by referring also to the partial area of the another frame having the correlation.

11. A moving picture transcoding method which transcodes encoded moving picture data, the method comprising:

transcoding a specific frame to a first frame which does not refer to another frame;

analyzing each header portion of a succeeding frame of the specific frame to judge whether or not a succeeding frame of the specific frame has been encoded by referring to a frame preceding the specific frame before or after the transcoding a specific frame; and again encoding the succeeding frame, which has been judged in the judging to refer to the frame preceding the specific frame, by referring to any one frame in a range from the judged succeeding frame to the specific frame; and performing no encoding of the succeeding frame when the succeeding frame does not refer to any frame preceding the specific frame.

* * * * *